(12) United States Patent
Slick et al.

(10) Patent No.: US 7,003,667 B1
(45) Date of Patent: Feb. 21, 2006

(54) TARGETED SECURE PRINTING

(75) Inventors: Royce E. Slick, Mission Viejo, CA (US); Craig Mazzagatte, Aliso Viejo, CA (US); Neil Y. Iwamoto, Mission Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/411,070

(22) Filed: Oct. 4, 1999

(51) Int. Cl.
*H04L 9/00* (2006.01)
*H04K 1/00* (2006.01)
*H04N 1/44* (2006.01)

(52) U.S. Cl. .................. 713/182; 388/45; 388/243; 388/282; 388/284; 388/285

(58) Field of Classification Search ............ 380/45, 380/285, 284, 282
See application file for complete search history.

(56) References Cited

U.S. PATENT DOCUMENTS

| | | | |
|---|---|---|---|
| 5,392,351 A | 2/1995 | Hasebe et al. ............ 380/4 |
| 5,606,613 A | 2/1997 | Lee et al. ................ 380/21 |
| 5,633,932 A * | 5/1997 | Davis et al. ............. 713/176 |
| 5,720,012 A | 2/1998 | McVeigh et al. ......... 395/113 |
| 5,752,697 A | 5/1998 | Mandel et al. .......... 271/288 |
| 5,903,646 A | 5/1999 | Rackman ................ 380/4 |
| 5,933,498 A | 8/1999 | Schneck et al. ......... 380/4 |
| 5,933,501 A | 8/1999 | Leppek ................. 380/21 |
| 5,949,881 A | 9/1999 | Davis .................. 380/25 |

(Continued)

FOREIGN PATENT DOCUMENTS

EP        859341        8/1998

(Continued)

OTHER PUBLICATIONS

Schneier, Bruce; "Applied Cryptography Second Edition;" 1996; John Wiley & Sons, Inc.; Chapter 15, p. 357-358; Chapter 8.1, p. 173-174.*

(Continued)

*Primary Examiner*—Gilberto Barron, Jr.
*Assistant Examiner*—Cas Stulberger
(74) *Attorney, Agent, or Firm*—Fitzpatrick, Cella, Harper & Scinto

(57) ABSTRACT

Secure transmission of data to an intended image output device, wherein the data can be used to generate an image at the intended image output device in the presence of an intended recipient. The data is encrypted using a first key. The first key is then encrypted using a second key and a third key. The second key is a public key of a first private key/public key pair, a private key of the first private key/public key pair being primarily in the sole possession of the intended image output device. The third key is a public key of a second private key/public key pair, a private key of the second private key/public key pair being primarily in the sole possession of the intended recipient of the image. The encrypted data and the twice-encrypted first key are transmitted to the intended image output device. The twice-encrypted first key is then decrypted by using the private keys of the second and first key pairs, respectively, which are primarily in the sole possession of the intended recipient device and the intended image output device, respectively. The data is then decrypted and printed at an image output device.

123 Claims, 13 Drawing Sheets

U.S. PATENT DOCUMENTS

| | | | | |
|---|---|---|---|---|
| 5,956,407 A | * | 9/1999 | Slavin | 380/30 |
| 6,226,618 B1 | * | 5/2001 | Downs et al. | 705/1 |
| 6,243,466 B1 | * | 6/2001 | Young et al. | 380/28 |
| 6,314,521 B1 | | 11/2001 | Debry | 713/201 |
| 6,343,361 B1 | | 1/2002 | Nendell et al. | 713/171 |
| 6,378,070 B1 | * | 4/2002 | Chan et al. | 713/155 |
| 6,385,728 B1 | * | 5/2002 | DeBry | 713/201 |
| 6,430,690 B1 | | 8/2002 | Vanstone et al. | 713/182 |
| 6,466,921 B1 | | 10/2002 | Cordery et al. | 705/60 |

FOREIGN PATENT DOCUMENTS

EP         935182         8/1999

OTHER PUBLICATIONS

Dannenberg, Roger B., et al., "A Butler Process for Resource Sharing on Spice Machines", ACM Transactions on Office Information Systems, vol. 3, No. 3, pp. 234-252, Jul. 1985.

U.S. Appl. No. 09/222,846, filed Dec. 30, 1998.

* cited by examiner

TARGETED SECURE PRINTING

BACKGROUND OF THE INVENTION

1. Field of the Invention

The present invention concerns secure printing wherein an image can be generated only by an intended image output device in the presence of an intended recipient. In particular, the invention concerns encryption of print data in such a manner that the data can only be decrypted using information supplied both by the intended image output device and by the intended recipient.

2. Description of the Related Art

In a networked office environment, a print job generated by a computer at one location in the network can be printed by an image output device at another location. If the print job includes confidential or otherwise sensitive information, concerns arise about unauthorized interception of the print job at one of several points in the network. In particular, the print job can be intercepted by a device on the network such as a computer system running simple network snooping tools.

In addition, concerns also arise about unauthorized viewing of the printed output. The printed document may be viewed by any person who happens to be near the image output device before the intended recipient arrives to collect the document.

Similar issues arise with a facsimile transmission. The transmission can be intercepted, and any person who arrives at a destination facsimile machine before the intended recipient can view the facsimile document.

SUMMARY OF THE INVENTION

Accordingly, what is needed is an arrangement whereby a printed or faxed document can only be generated at an intended image output device in the presence of an intended recipient.

The invention addresses the foregoing need by encrypting print data using a symmetric encryption algorithm with a randomly generated symmetric key, and then encrypting the symmetric key so that it can only be recovered by an intended image output device in the presence of an intended recipient. The encryption of the key is performed by an asymmetric encryption (i.e., public/private key-pair) algorithm. The key is encrypted twice, using public keys for both the intended recipient and for the intended image output device. Then, the encrypted print data and the encrypted randomly generated key are sent to the image output device.

In order to generate an image for the document, the twice-encrypted symmetric key is decrypted using the private keys for both the image output device and the intended recipient. Preferably, the private key for the intended recipient must be personally supplied by the recipient. Upon decryption of the symmetric key, the print data is decrypted using the decrypted symmetric key, and an image is output by the image output device in accordance with the decrypted print data.

As a result of the foregoing arrangement, the symmetric key can only be recovered using the private keys for both the intended recipient and for the intended image output device. Thus, as long as the private keys remain in the sole possession of the intended recipient and the intended image output device, respectively, the symmetric key can only be recovered at the intended image output device in the presence of the intended recipient. Because the symmetric key is needed to decrypt the print data, an image can be printed from the print data only at the intended image output device in the presence of the intended recipient.

Accordingly, one aspect of the present invention concerns secure transmission of data to an intended image output device such as a printer or a facsimile machine. The data can be used to generate an image only at the intended image output device in the presence of an intended recipient. The data is encrypted using a first key. The first key is then twice encrypted using a second key and then a third key. The second key is the public key of a first private key/public key pair, the private key of the first private key/public key pair being primarily in the sole possession of the intended image output device. The third key is the public key of a second private key/public key pair, the private key of the second private key/public key pair being primarily in the sole possession of the intended recipient. The encrypted data and the twice-encrypted first key both are then transmitted to the intended image output device.

Preferably, the first key is randomly generated. In addition, the encryption of the data with the first key is preferably performed using a symmetric encryption algorithm, and the encryption of the first key with the second and third keys are preferably performed using an asymmetric encryption algorithm.

Moreover, the order of encryption of the first key using the second and third keys can be reversed. For instance, encryption of the first key using the second key can occur before a second encryption of the first key using the third key. Alternatively, encryption of the first key using the third key can occur before a second encryption of the first key using the second key.

Preferably, the twice-encrypted first key is contained within a header along with other information relating to the identities of the sender and the recipient. Also, in the preferred embodiment, the method further includes the steps of processing the header and the encrypted data by application of a cryptographic hashing algorithm, resulting in a header hash and a data hash, and of digitally signing the header hash and the data hash with a fourth key. The fourth key is the private key of a third private key/public key pair, the private key of the third private key/public key pair being primarily in the sole possession of the person initiating the transmission of data. The transmitting step preferably transmits the signed header hash and the signed data hash along with the encrypted data and the twice-encrypted first key.

By virtue of the foregoing arrangements, data for generating an image can be transmitted to an image output device, whereby the image is only capable of being printed by the intended image output device in the presence of an intended recipient.

In another aspect, the invention concerns generation of an image from data transmitted to an intended image output device, such as a printer or a facsimile machine, or such a device itself. The data can be used to generate the image only at the intended image output device in the presence of an intended recipient. Encrypted data and a twice-encrypted first key are received by the device. The encrypted first key is twice decrypted using a second key and a third key, respectively. The second key is a private key of a first private key/public key pair, the private key of the first private key/public key pair being primarily in the sole possession of the intended recipient. The third key is a private key of a second private key/public key pair, the private key of the second private key/public key pair being primarily in the sole possession of the intended image output device. After the encrypted first key is twice decrypted, the encrypted data is decrypted using the decrypted first key, and an image is generated by the intended image output device from the decrypted data.

Preferably, the decryption of the first key using the second and third keys is performed using an asymmetric decryption algorithm. Decryption of the encrypted data using the decrypted first key is preferably performed using a symmetric decryption algorithm.

Depending upon the order of encryption of the first key, decryption of the first key using the second key can occur before decryption of the first key using the third key. Alternatively, decryption of the first key using the third key can occur before decryption of the first key using the second key.

In the preferred embodiment, the second key is contained in a smart-card which is in the possession of the intended recipient. Thus, the second key is primarily accessible only with permission by the intended recipient. Likewise, the third key is preferably contained in a smart-chip which is maintained internally in the intended image output device, thereby being shielded from access by devices other than the intended image output device.

Preferably, the device also receives a header containing information related to the identities of the sender and the recipient. Also, in the preferred embodiment, the receiving step further includes receipt of a signed header hash and a signed data hash. The authenticity of the signed header hash and of the signed data hash preferably are verified using a fourth key which is the public key of a third public key/ private key pair; the private key of the third public key/ private key pair being primarily maintained in the sole possession of the person who initiated the transmission of the data for receipt by the device. If the signed header hash or the signed data hash fail verification of authenticity, the encrypted data is preferably discarded. Otherwise, the integrity of the signed header hash and the signed data hash are verified by application of a cryptographic hashing algorithm to the header and the encrypted data. If the signed header hash or the signed data hash fail the verification of integrity, the encrypted data is preferably discarded.

By virtue of the foregoing arrangements, data sent to an image output device is used to generate an image only if the data is intended for that image output device, and only if an intended recipient is present to supply a needed private key.

Another aspect of the invention concerns secure transmission of data to an intended image output device, wherein the data can be used to generate an image only at the intended image output device in the presence of an intended recipient. In this aspect, the data is encrypted twice using a first key and a second key, the first key being the public key of a first private key/public key pair, the private key of the first private key/public key pair being primarily in the sole possession of the intended image output device, and the second key being the public key of a second private key/ public key pair, the private key of the second private key/public key pair being primarily in the sole possession of the intended recipient of the image. The twice-encrypted data is then transmitted to the intended image output device.

By virtue of the foregoing arrangements, data for generating an image can be transmitted to an image output device, whereby the image is only capable of being printed by the intended image output device in the presence of an intended recipient.

In another aspect, the invention is directed to generation of an image from twice-encrypted data transmitted to an intended image output device, wherein the twice-encrypted data can be used to generate the image only at the intended image output device in the presence of an intended recipient. In this aspect, twice-encrypted data is received and then twice decrypted by using a first key and a second key. The first key is the private key of a first private key/public key pair, the private key of the first private key/public key pair being primarily in the sole possession of the intended recipient of the image. The second key is a private key of a second private key/public key pair, the private key of the second private key/public key pair being primarily in the sole possession of the intended image output device. An image is then generated from the decrypted data.

By virtue of the foregoing arrangements, data sent to an image output device is used to generate an image only if the data is intended for that image output device, and only if an intended recipient is present to supply a needed private key.

In yet another aspect of the invention, a method is provided for secure transmission of data to an intended image output device, wherein the data can be used to generate an image at the intended image output device in the presence of an intended recipient. The method comprises a first encrypting step of encrypting the data using a first key, and a second encrypting step of twice encrypting the first key using a second key and a third key, the second key being a public key of a first private key/public key pair, a private key of the first private key/public key pair being primarily in the sole possession of the intended image output device, and the third key being a public key of a second private key/ public key pair, a private key of the second private key/ public key pair being primarily in the sole possession of the intended recipient of the image. A generating step then generates a header containing the twice-encrypted first key and in a first transmitting step, the header is transmitted to the intended image output device. In a receiving step a request is received from the intended image output device for the encrypted data, and then in a second transmitting step the encrypted data is transmitted to the intended image output device.

By virtue of the foregoing arrangements, a header for a print job can be sent to an intended image output device, but the corresponding encrypted data does not have to be sent to the intended image output device until required by the intended image output device. In addition, the intended image output device is used to generate an image only if the data is intended for that image output device, and only if an intended recipient is present to supply a needed private key.

In another aspect of the invention, a method is provided for generating an image from data transmitted to an intended image output device, wherein the data can be used to generate the image at the intended image output device in the presence of an intended recipient. The method comprises a receiving step of receiving a header containing a twice-encrypted first key and a sending step of sending a request for encrypted data corresponding to the header. The method also comprises a receiving step of receiving encrypted data corresponding to the header, and a first decrypting step of twice decrypting the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/public key pair being primarily in the sole possession of the intended image output device. A second decrypting step is provided for decrypting the encrypted data using the decrypted first key, and an image generating step generates an image from the decrypted data.

By virtue of the foregoing arrangements, a header for a print job can be sent to an intended image output device, but the corresponding encrypted data does not have to be sent to the intended image output device until required by the intended image output device. In addition, the intended image output device is used to generate an image only if the data is intended for that image output device, and only if an intended recipient is present to supply a needed private key.

The invention may be implemented in method or apparatus, or computer-executable process steps, such as a printer driver, an image output device for transmitting the data for secure printing, as well as special-purpose apparatus such as a printer or a facsimile machine for receiving and printing the data.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

The present invention is generally directed to the secure printing of image data such that the image data can only be printed on an intended output image device in the presence of an intended recipient. The present invention therefore provides a manner by which a document can be securely transmitted from a computer to a remote image output device in a networked environment. The document is maintained in a secure fashion until the intended recipient is present at the intended image output device, whereupon the intended image output device prints the image.

Figure 1:
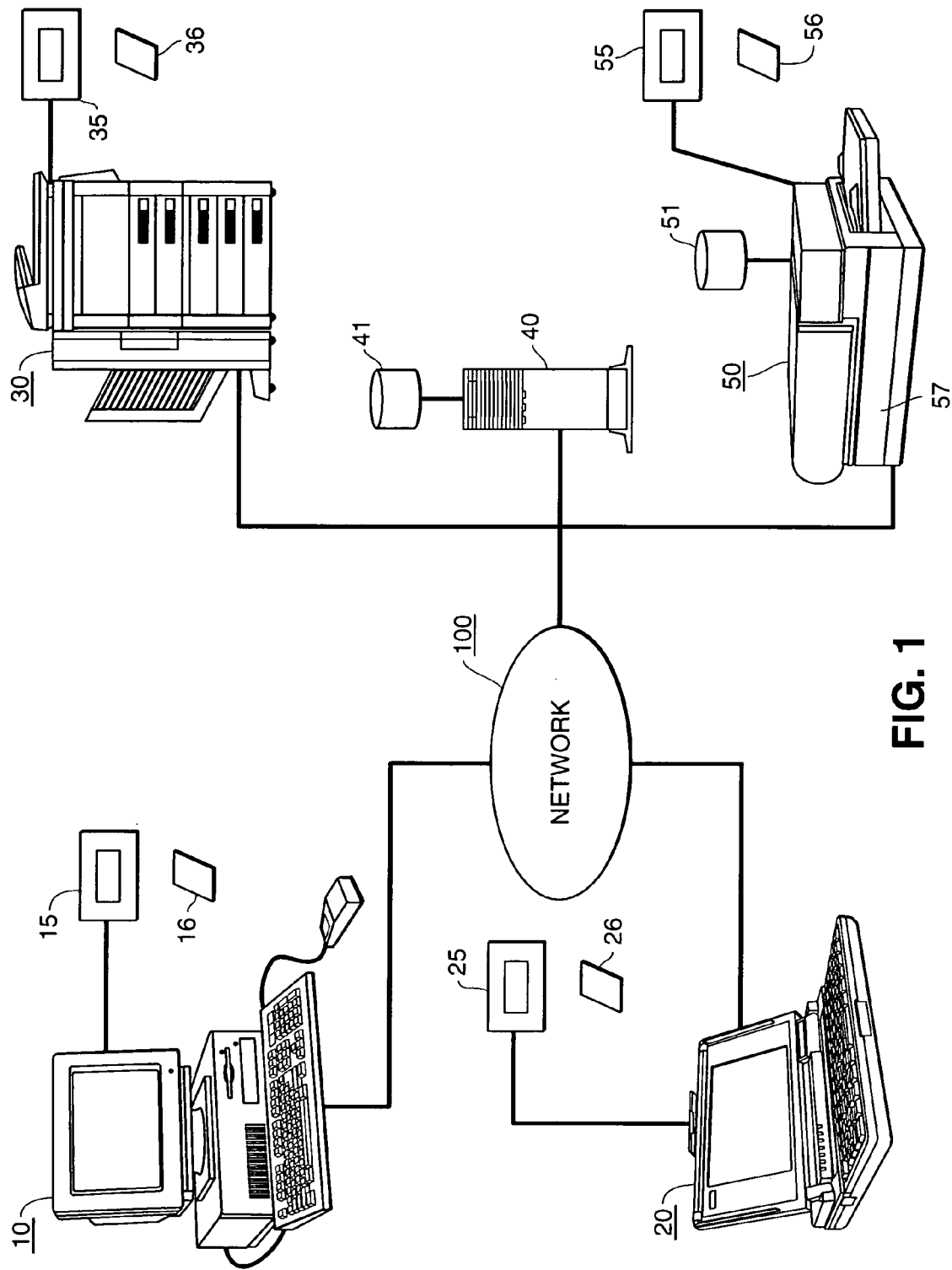
FIG. 1 is a representative view of a networked computing environment in which the present invention may be implemented.

FIG. 1 provides an overall system view of a networked computing environment in which the present invention may be implemented. As shown in FIG. 1, the networked computing environment comprises a network which is connected to desktop computer 10, laptop computer 20, server 46, digital copier 30 and printer 50. Network 100 is preferably an Ethernet network medium consisting of a bus-type physical architecture, although the invention can be utilized over other types of networks, including the internet.

Desktop computer 10 is preferably an IBM PC-compatible computer having a windowing environment such as Microsoft Windows 95, Windows 98 or Windows NT. As is typical with IBM PC-compatible computers, desktop computer 10 preferably has a display, keyboard, mouse, floppy drive and/or other type of storage medium (not shown). Also attached to desktop computer 10 is smart-card interface device 15 for interfacing with a smart-card of a computer user, such as smart-card 16. Smart-card 16 therefore provides a mechanism whereby a computer user can authenticate the user's identity to desktop computer 10. In addition, smart-card 16 contains a private key of a private/public key pair which is specific to a computer user and which is used in the present invention for the secure printing of image data as discussed more fully below.

Laptop computer 20 is also an IBM PC-compatible computer having a windowing environment such as Microsoft Windows 95, Windows 98 or Windows NT. Like desktop computer 10, laptop computer 20 also has a display, keyboard, mouse and floppy drive or other storage means (not shown). In addition, laptop computer 20 also has a smart-card interface device 25 attached to it for interfacing to the smart-card of a computer user such as smart-card 26. Also attached to network 100 is digital copier 30, which is capable of receiving image data over network 100 for printing. Digital copier 30 also has attached smart-card interface device 35 for interfacing with the smart-card of a print job recipient, such as smart-card 36. In addition, server 40 is also connected to network 100. Server 40 preferably comprises an IBM PC-compatible computer having an operating system such as DOS, Microsoft Windows 95, Windows 98 or Windows NT, UNIX or other operating system. Server 40 has a storage device 41 which is preferably a large fixed disk for storing numerous files. Server 40 can therefore be utilized by other devices on network 100 as a file server and may also act as a gateway for other devices on network 100 to another network such as the Internet.

Printer 50 is also connected to network 100 and is preferably a laser or bubble-jet printer which is capable of operating as both a printer and a facsimile device. Printer 50 has a storage device 51 which is preferably a large fixed disk, and also has an embedded smart-chip 57 which contains a private key of a private/public key pair corresponding to printer 50 for use in encryption and/or decryption of data received by printer 50. In addition, printer 50 is connected to smart-card interface device 55 which is capable of interfacing with a smart-card of a print job recipient, such as smart-card 56. In this manner, the printing of a print job for a particular intended recipient may be controlled through the use of smart-card interface device 55 and smart-card 56, in combination with smart-chip 57 in printer 50.

Figure 2:
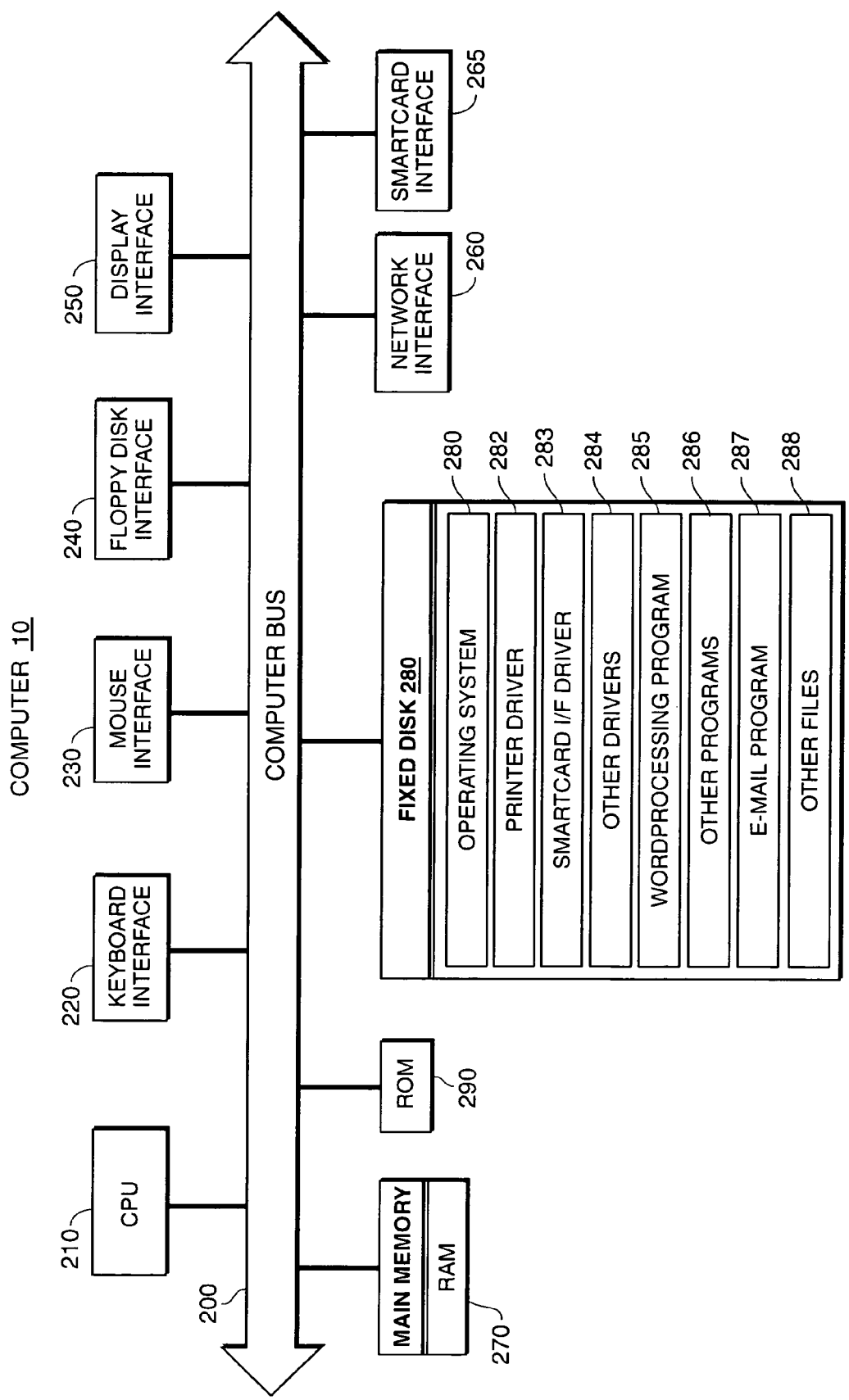
FIG. 2 is a detailed block diagram showing the internal architecture of the computer shown in FIG. 1 according to the present invention.

FIG. 2 is a block diagram showing an overview of the internal architecture of desktop computer 10. In FIG. 2, desktop computer 10 is seen to include central processing unit (CPU) 210 such as a programmable microprocessor which is interfaced to computer bus 200. Also coupled to computer bus 200 are keyboard interface 220 for interfacing to a keyboard, mouse interface 230 for interfacing to a pointing device, floppy disk interface 240 for interfacing to a floppy disk, display interface 250 for interfacing to a display, network interface 260 for interfacing to network 100, and smart-card interface 265 for interfacing to smart-card interface device 15.

Random access memory ("RAM") 270 interfaces to computer bus 200 to provide central processing unit ("CPU") 210 with access to memory storage, thereby acting as the main run-time memory for CPU 210. In particular, when executing stored program instruction sequences, CPU 210 loads those instruction sequences from fixed disk 280 (or other memory media) into random access memory ("RAM") 270 and executes those stored program instruction sequences out of RAM 270. It should also be noted that standard-disk swapping techniques available under windowing operating systems allow segments of memory to be swapped to and from RAM 270 and fixed disk 280. Read-only memory ("ROM") 290 stores invariant instruction sequences, such as start-up instruction sequences for CPU 210 or basic input/output operation system ("BIOS") sequences for the operation of peripheral devices attached to computer 10.

Fixed disk 280 is one example of a computer-readable medium that stores program instruction sequences executable by central processing unit ("CPU") 210 so as to constitute operating system 281, printer driver 282, smart-card interface driver 283, other drivers 284, word processing program 285, other programs 286, e-mail program 287 and other files 288. As mentioned above, operating system 281 is preferably a windowing operating system, although other types of operating systems may be used with the present invention. Printer driver 282 is utilized to prepare image data for printing on at least one image output device, such as printer 50. Smart-card interface driver 283 is utilized to drive and control smart-card interface 265 for interfacing with smart-card interface device 15 so as to read and write to a smart-card such as smart-card 16. Other drivers 284 include drivers for each of the remaining interfaces which are coupled to computer bus 200.

Word processing program 285 is a typical word processor program for creating documents and images, such as Microsoft Word, or Corel WordPerfect. Other programs 286 contains other programs necessary to operate desktop computer 10 and to run desired applications. E-mail program 287 is a typical e-mail program that allows desktop computer 10 to receive and send e-mails over network 100. Other files 288 include any of the files necessary for the operation of desktop computer 10 or files created and/or maintained by other application programs on desktop computer 10.

Figure 3:
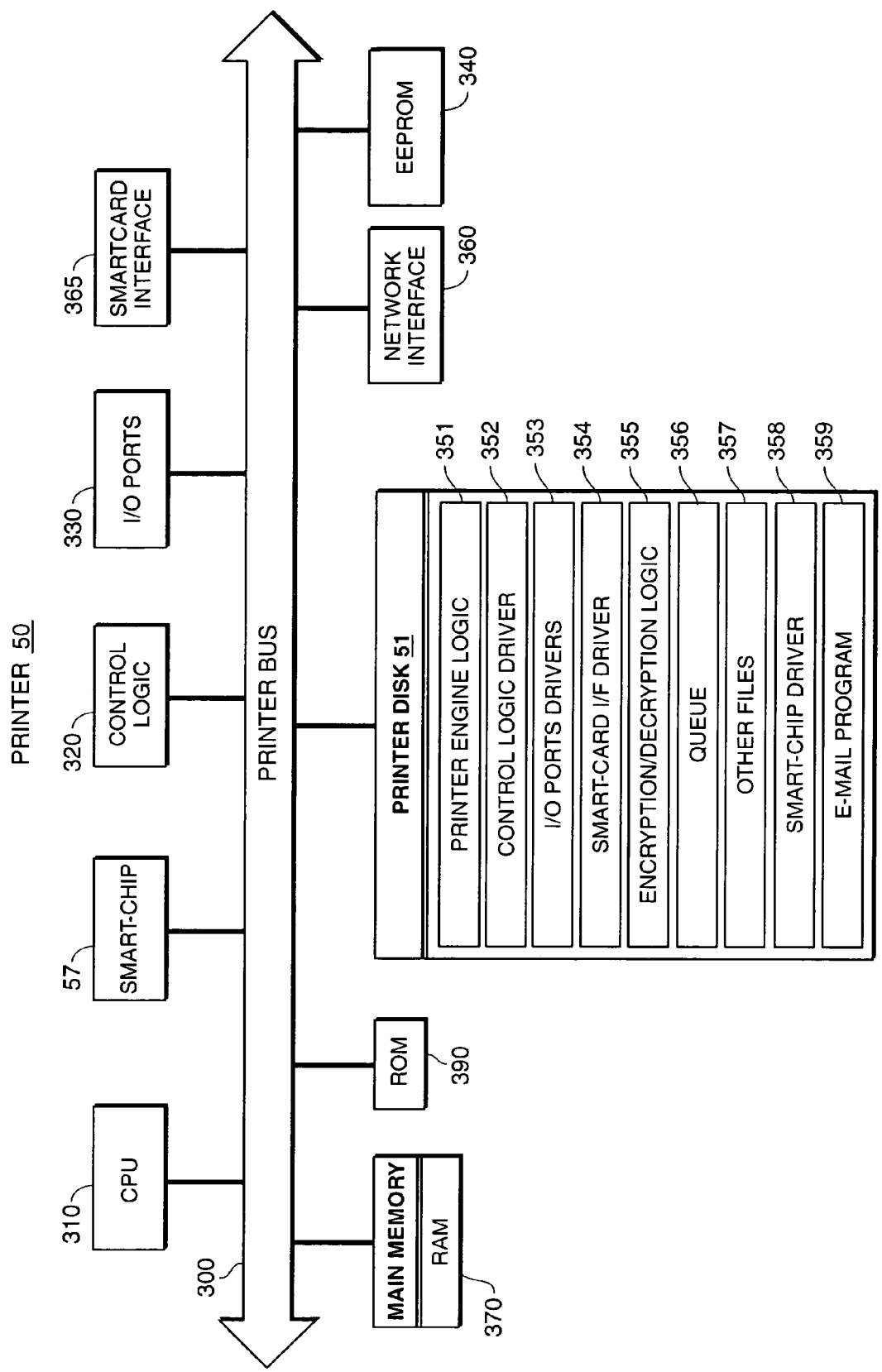
FIG. 3 is a detailed block diagram showing the internal architecture of the printer shown in FIG. 1 according to the present invention.

FIG. 3 is a block diagram showing an overview of the internal architecture of printer 50. In FIG. 3, printer 50 is seen to contain a printer smart-chip 57 which, as previously mentioned, contains a private key corresponding to printer 50 for encryption/decryption purposes. Printer 50 also contains a central processing unit ("CPU") 310 such as a programmable microprocessor which is interfaced to printer bus 300. Also coupled to printer bus 300 are control logic 320, which is utilized to control the printer engine of printer 50 (not shown), I/O ports 330 which is used to communicate with various input/output devices of printer 50 (not shown), smart-card interface 365 which is utilized to interface with smart-card interface device 55, and network interface 360 which is utilized to interface printer 50 to network 100.

Also coupled to printer bus 300 are EEPROM 340, for containing non-volatile program instructions, random access memory ("RAM") 370, printer memory 51 and read-only memory ("ROM") 390. RAM 370 interfaces to printer bus 300 to provide CPU 310 with access to memory storage, thereby acting as the main run-time memory for CPU 310. In particular, when executing stored program instruction sequences, CPU 310 loads those instruction sequences from printer memory 51 (or other memory media) into RAM 370 and executes those stored program instruction sequences out of RAM 370. ROM 390 stores invariant instruction sequences, such as start-up instruction sequences for CPU 310 or BIOS sequences for the operation of various peripheral devices of printer 50 (not shown).

Printer memory 51 is one example of a computer-readable medium that stores program instruction sequences executable by CPU 310 so as to constitute printer engine logic 351, control logic driver 352, I/O port drivers 353, smart-card interface driver 354, encryption/decryption logic 355, queue 356, other files 357, printer smart-chip driver 358, and e-mail program 359. Printer engine logic 351 and control logic driver 352 are utilized to control and drive the printer engine of printer 50 (not shown) so as to print an image according to image data received by printer 50, preferably over network 100. I/O port drivers 353 are utilized to drive the input and output devices (not shown) connected through I/O ports 330. Smart-card interface driver 354 is utilized to drive smart-card interface 365 for interfacing to smart-card interface device 55, thereby enabling printer 50 to read and write to a smart-card such as smart-card 56.

Encryption/decryption logic 355 enables printer 50 to receive encrypted data according to the present invention and to carry out the necessary steps to enable the decryption of the encrypted print data in the presence of an intended recipient. The details of these steps are discussed more fully below. Queue 356 is utilized to contain a print queue comprised of numerous print jobs which are to be printed. Other files 357 contain other files and/or programs for the operation of printer 50. Printer smart-chip driver 358 is utilized to drive and interface with printer smart-chip 57 for encryption/decryption purposes. Lastly, e-mail program 359 is a typical e-mail program for enabling printer 50 to receive e-mail messages from network 100. Such e-mail messages may contain print job-related information, as discussed in more detail below.

Figure 4:
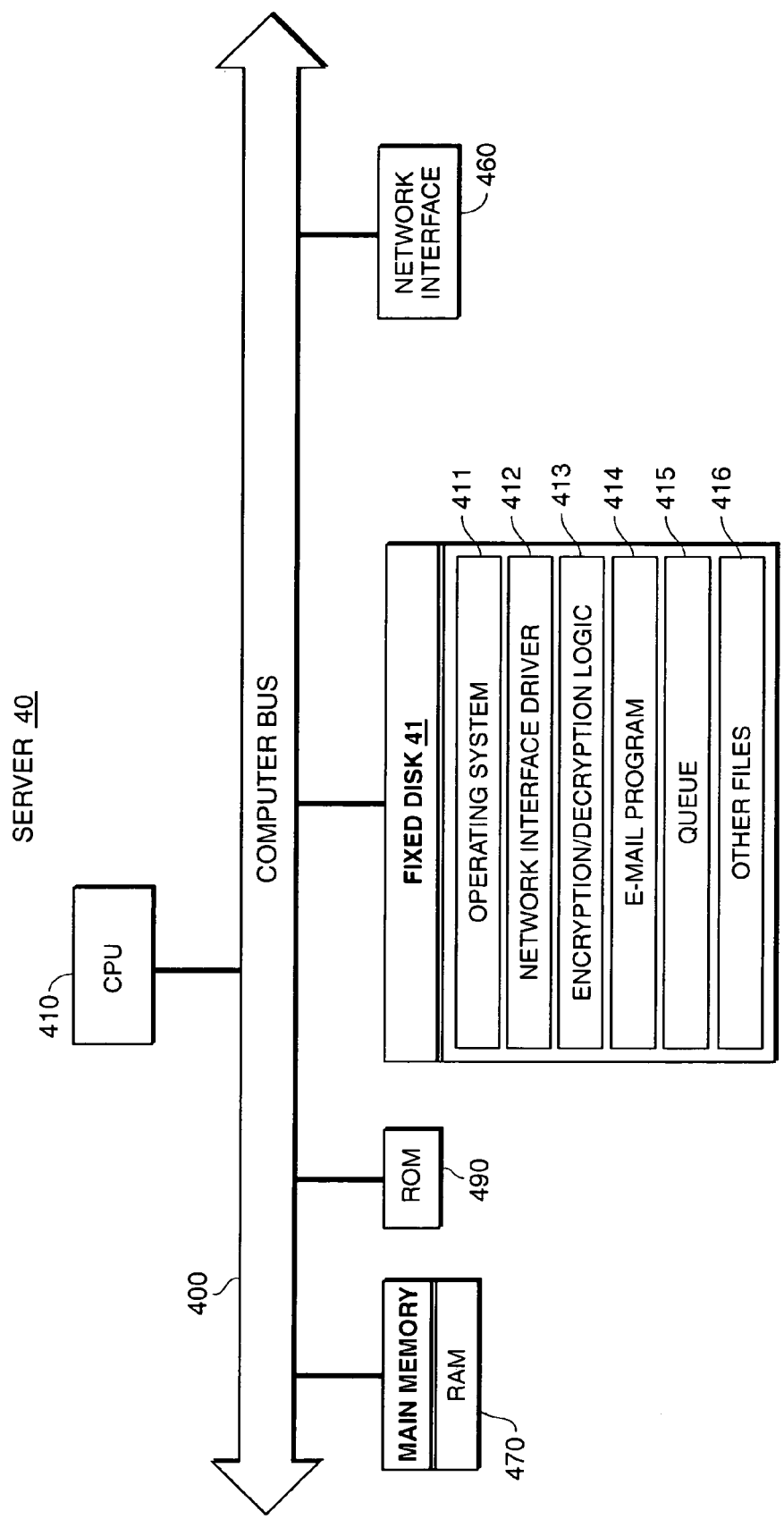
FIG. 4 is a detailed block diagram showing the server shown in FIG. 1 according to the present invention.

FIG. 4 is a block diagram showing an overview of the internal architecture of server 40. In FIG. 4, server 40 is seen to include a central processing unit ("CPU") 410 such as a programmable microprocessor which is interfaced to computer bus 400. Also coupled to computer bus 400 is a network interface 460 for interfacing to network 100. In addition, random access memory ("RAM") 470, fixed disk 41, and read-only ("ROM") 490 are also coupled to computer bus 400. RAM 470 interfaces to computer bus 400 to provide CPU 410 with access to memory storage, thereby acting as the main run-time memory for CPU 410. In particular, when executing stored program instruction sequences, CPU 410 loads those instruction sequences from fixed disk 41 (or other memory media) into RAM 470 and executes those stored program instruction sequences out of RAM 470. It should also be recognized that standard disk-swapping techniques allow segments of memory to be swapped to and from RAM 470 and fixed disk 41. ROM 490 stores invariant instruction sequences, such as start-up instruction sequences for CPU 410 or basic input/output operating system ("BIOS") sequences for the operation of peripheral devices which may be attached to server 40 (not shown).

Fixed disk 41 is one example of a computer-readable medium that stores program instruction sequences executable by CPU 410 so as to constitute operating system 411, network interface driver 412, encryption/decryption logic 413, e-mail program 414, queue 415, and other files 416. As mentioned above, operating system 411 can be an operating system such as DOS, Windows 95, Windows 98, Windows NT, UNIX, or other such operating system. Network interface driver 412 is utilized to drive network interface 460 for interfacing server 40 to network 100. Encryption/decryption logic 413 allows server 40 to receive encrypted data and to either maintain such data in queue 415 or to send such data to an image output device such as printer 50 for printing. E-mail program 414 is a typical e-mail program and enables server 40 to receive and/or send e-mail messages over network 100. Queue 415 is utilized to store numerous print jobs for output on one or more image output devices, such as printer 50. Lastly, other files 416 contains other files or programs necessary to operate server 40 and/or to provide additional functionality to server 40.

Figure 5A:
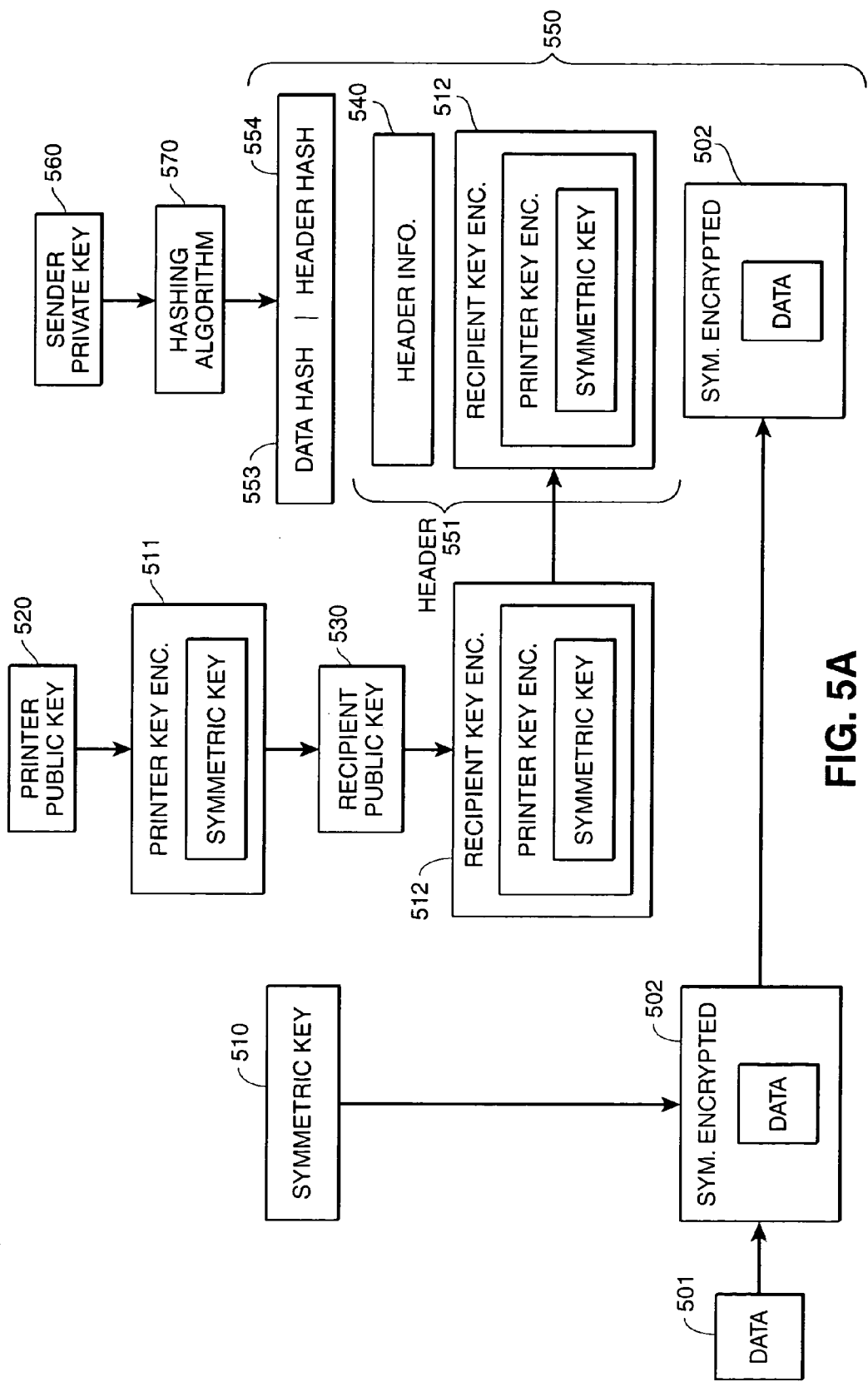
FIG. 5A is a view for providing an explanation of encryption of data and a symmetric key of a secure print job according to a first embodiment of the present invention.

FIG. 5A is a view for explaining the encryption process of the present invention which enables a computer user of a computer on network 100, such as desktop computer 10, to send data related to a print job for printing only on an intended image output device when an intended recipient is present. For instance, a computer user located at desktop computer 10 may wish to prepare a document using word processing program 285 for printing only on printer 50 at a later time when an intended recipient is physically present at printer 50. Most importantly, the computer user at desktop computer 10 wishes to protect the print job data from being accessed or viewed by any device other than printer 50 or by any person other than the intended recipient. Therefore, the present invention encrypts the image data so that it cannot be accessed by any other computer user or device on network 100 and so that it will remain encrypted up until the time the intended recipient is physically present at the intended printer. In this manner, even if the encrypted data is accessed at any point prior to the printing on the intended printer 50, the data will only appear to be a pile of unintelligible bits.

Specifically, as seen in FIG. 5A, the encryption process starts with image data 501 which is preferably created by a computer user at desktop computer 10 using a program such as word processing program 285. When the computer user is ready to send a print job corresponding to data 501 to an intended printer, such as printer 50, for receipt by an intended recipient, the user preferably presses a button provided in word processing program 285 to indicate that the document is to be printed in a secure fashion. In the preferred mode, printer driver 282 handles the encryption process for encrypting data 501 before it is sent over network 100 to printer 50. Preferably, printer driver 282 generates a randomly-generated symmetric key for use with a symmetric encryption algorithm. Data 501 is then encrypted by applying the symmetric encryption algorithm using the randomly-generated symmetric key 510, thereby creating symmetrically encrypted data 502. In this manner, symmetrically encrypted data 502 can only be decrypted by a device having a similar symmetric encryption algorithm and a copy of symmetric key 510. Therefore, symmetric key 510 and symmetrically encrypted data 502 must be passed to printer 50 in order for the data to eventually be decrypted and printed out for the intended recipient. In order to maintain security until such time as data 501 is printed on printer 50, symmetric key 510 is also encrypted with two public keys which correspond to the intended printer and the intended recipient. Each public key is from a public key/private key pair which is used in an asymmetric encryption algorithm. In this manner, only the combination of private keys of the intended recipient and the intended printer will allow symmetric key 510 to be decrypted such that symmetrically encrypted data 502 can be decrypted for printing.

Therefore, as seen in FIG. 5A, printer public key 520 corresponding to printer 50 is obtained from a public key infrastructure which is provided on a server on network 100, from a third-party key service via network 100, or from another suitable source such as a local key storage file. Printer public key 520 is then utilized in conjunction with an asymmetric encryption algorithm to encrypt symmetric key 510, thereby creating printer-key-encrypted symmetric key 511. In this manner, symmetric key 510 cannot be accessed without the corresponding private key of the public/private key pair corresponding to printer 50. As discussed above, the private key for printer 50 is preferably maintained in smart-chip 57 which is embedded within printer 50 so as to prevent exposure of the private key to any other person or device. In this manner, printer key encrypted symmetric key 511 can only be decrypted by the intended image output device, in this case printer 50.

Although the above encryption of symmetric key 510 ensures that only the intended printer can print the print job, it does not ensure that only the intended recipient will receive the print job for viewing. Therefore, it is also preferable to further encrypt symmetric key 510 with a public key corresponding to the intended recipient. As shown in FIG. 5A, recipient public key 530 is also obtained from a public key infrastructure, or other suitable source. The printer-key-encrypted symmetric key 511 is then encrypted again using recipient public key 530 in conjunction with an asymmetric encryption algorithm to create twice-encrypted symmetric key 512. Twice-encrypted symmetric key 512 is shown to be encrypted at a first layer with printer public key 520 and at a second layer with recipient public key 530, thereby preventing access to symmetric key 510 unless the specific combination of private keys of the intended recipient and intended printer is provided.

As further shown in FIG. 5A, a header 540 is provided to contain twice-encrypted symmetric key 512 and also to contain information related to the print job such as the sender's identity, the intended recipient's identity, and other information such as the size of the print job, and printer-related settings such as selection of a collating option, a stapling option, and a paper-selection option. In this manner, non-confidential information related to the print job itself can be provided to the intended printer for purposes of print job queuing and identification of the print job for eventual printing. It can be appreciated that header 540 may contain other types of information and may also be provided in a format which does not contain twice-encrypted symmetric key 512. In the preferred embodiment, header information 540 is prepended to twice-encrypted symmetric key 512 to create header 551. Once header 551 is created, an integrity algorithm is applied to header 551 and symmetrically encrypted data 502 in order to provide an integrity check whereby the receiving device may verify that header 551 and symmetrically encrypted data 502 have not been altered in any fashion. Specifically, header 551 and symmetrically encrypted data 562 are processed with hash algorithm 570 which is used to ensure the integrity of the data. The algorithm results in a value known as a "hash" which represents a type of checksum for the corresponding data.

Therefore, a data hash 553 and a header hash 554 are created and are thereupon digitally signed using sender private key 560 of a private key/public key pair corresponding to the sender who initiated the print job. In this manner, print job 550 is created which contains header 551, symmetrically encrypted data 502, data hash 553 and header hash 554. Sender private key 560 is preferably obtained from a smart-card, such as smart-card 16, belonging to the sender at desktop computer 10 via smart-card interface device 15. In the case where the sender and the intended recipient are the same person, sender private key 560 is from the same private key/public key pair as the recipient public key 530. In such a situation, the sender can send a secure print job to an intended printer from a remote location and can then later retrieve the print job with the sender's smart-card at the printer.

In this manner, print job 550 can be transmitted to the intended image output device, in this case printer 50, for being queued and eventually printed in the presence of the intended recipient. Intended printer 50 can then perform authentication of the sender of print job 550, verification of the integrity of header 551 and encrypted data 502 of print job 550, decryption of twice-encrypted symmetric key 512, and, finally, decryption of encrypted data 502 for printing on printer 50.

The encryption arrangement provided in FIG. 5A is a preferred embodiment of the present invention; however, it can be appreciated that the data corresponding to a secure print job can be encrypted using other combinations of public keys, and can also be encrypted directly using the aforementioned public keys with an asymmetric encryption algorithm. For instance, the order of encryption of symmetric key 510 can be reversed such that symmetric key 510 is first encrypted using recipient public key 530 and is then encrypted using printer public key 520. Therefore, twice-encrypted symmetric key 512 would first be decrypted using the private key of the intended printer and would then be decrypted using the private key of the intended recipient.

Figure 5B:
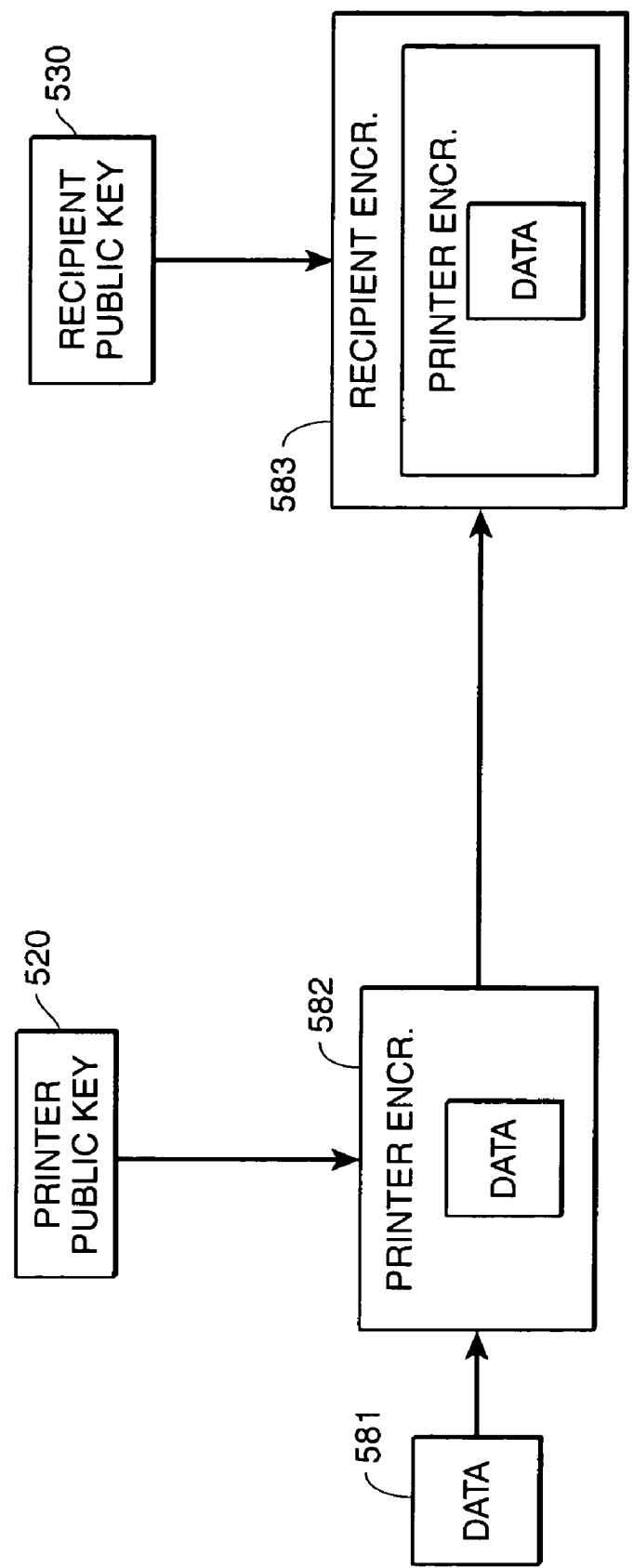
FIG. 5B is a view for providing an explanation of encryption of data of a secure print job according to a second embodiment of the present invention.

In FIG. 5B, the data associated with the secure print job is twice-encrypted using the public keys of the intended printer and intended recipient in conjunction with an asymmetric encryption algorithm, instead of with a symmetric key as shown in FIG. 5A. In FIG. 5B, data 581 is the print data associated with the secure print job. As in FIG. 5A, public keys of the intended printer (520) and intended recipient (530) are first obtained from a public key infrastructure or other suitable source. Thereafter, data 581 is encrypted using an asymmetric encryption algorithm in conjunction with recipient public key 530 so as to create recipient-key-encrypted data 582. Then, recipient-key-encrypted data 582 is again encrypted using an asymmetric encryption algorithm in conjunction with printer public key 520 to create twice-encrypted data 583. Therefore, as shown in FIG. 5B, the data itself is twice-encrypted for transmission to the intended printer after which it can only be decrypted with the private keys of the intended printer and the intended recipient, respectively.

Thus, the encryption arrangement depicted in FIG. 5B may be utilized to provide secure printing of a document ordinarily without the use of a symmetric key as depicted in FIG. 5A. The arrangement in FIG. 5B may also be combined with the other features of FIG. 5A, such as the creation of a header and a signed hash prior to transmittal of the twice-encrypted data to the intended printer. It should be noted that the encryption arrangement of FIG. 5A is the preferred embodiment because double-encryption of a potentially large amount of data corresponding to data 581 as depicted in FIG. 5B may require substantially greater computing resources than the encryption arrangement of FIG. 5A wherein only symmetric key 510 is double-encrypted.

Figure 5C:
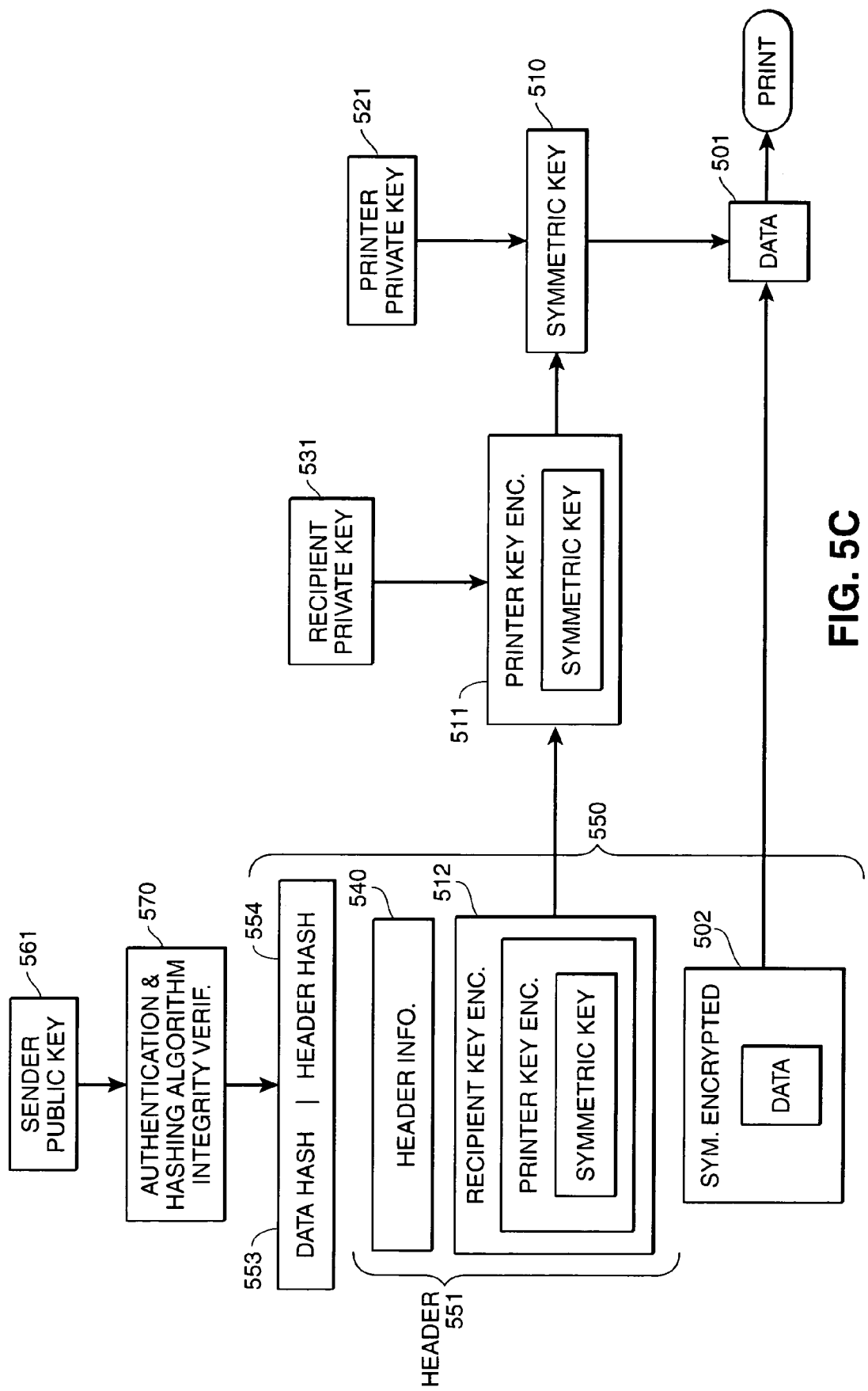
FIG. 5C is a view for providing an explanation of the decryption and printing of a secure print job according to an embodiment of the present invention.

FIG. 5C is a view for explaining the decryption and printing of data 501 which was encrypted according to FIG. 5A. First, print job 550 is received at the intended printer, in this case printer 50, via network 100, and contains the same components as depicted in FIG. 5A. Next, sender public key 561 is preferably obtained from a public key infrastructure, or other suitable source, and corresponds to the computer user at desktop computer 10 who sent the print job to printer 50. In the alternative, sender public key 561 can be provided in a copy of the sender's digital certificate contained within header information 540. Sender public key 561 is then used in conjunction with hashing algorithm 570 to authenticate and verify the integrity of header 551 and symmetrically encrypted data 502. Specifically, signed header hash 554 and signed data hash 553 are authenticated using sender public key 561 to verify that the sender was indeed the creator of print job 550. If the authentication fails, the print job is preferably discarded.

Next, print job 550 is stored in queue 356 of printer 50 or, in the alternative, is stored in queue 415 of server 40 for subsequent access by printer 50. Once the intended recipient is physically present at printer 50, recipient private key 531 is obtained through the recipient's smart-card, such as smart-card 56, which is inserted into smart-card interface device 55. For security reasons, recipient private key 531 is maintained solely on smart-card 56 and cannot be read by printer 50. Therefore, twice-encrypted symmetric key 512 is passed from printer 50 to smart-card 56 via smart-card interface device 55 where it is partially decrypted using recipient private key 531. Thereafter, partially-decrypted symmetric key 511 is returned from smart-card 56 to printer 50, wherein it is completely decrypted within smart-chip 57 of printer 50. This results in a "clear text" form of symmetric key 510.

Symmetric key 510 is then utilized to decrypt symmetrically-encrypted data 502 in order to obtain a clear text form of data 501. An image is then printed on printer 50 based upon decrypted data 501. In this manner it can be seen that the present invention provides the ability to transmit a document or image to an intended printer for printing only in the presence of an intended recipient. Until the intended recipient's presence is verified at the location of the intended printer, the print job is maintained in an encrypted form and cannot reasonably be decrypted by any other person or device that may have intercepted the encrypted data.

Figure 5D:
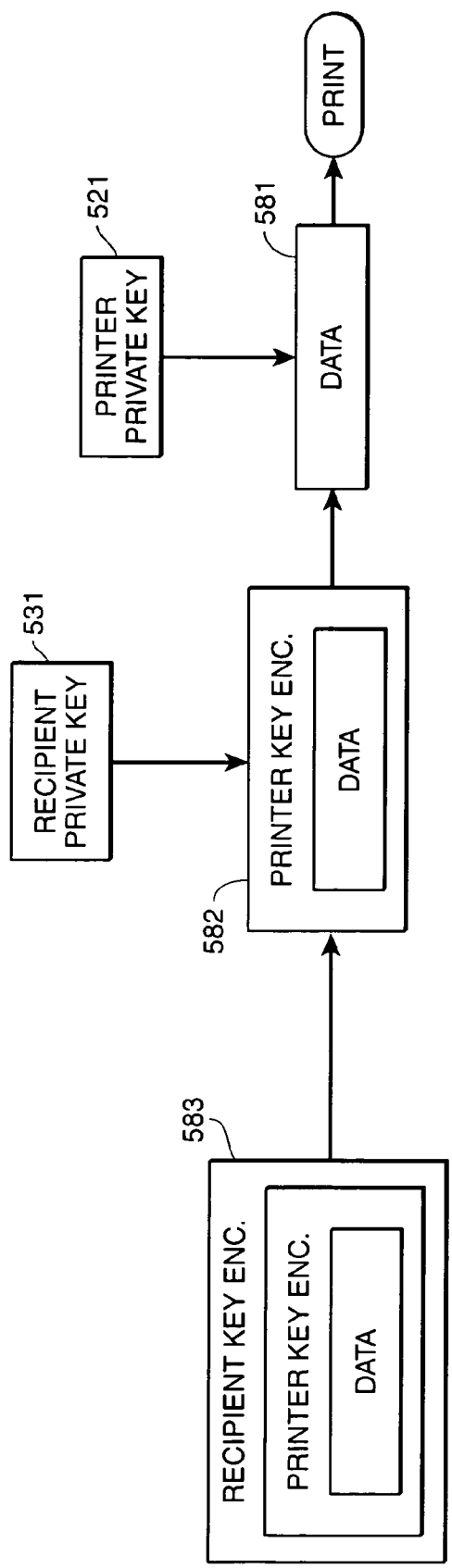
FIG. 5D is a view for providing an explanation of the decryption and printing of a secure print job according to another embodiment of the present invention.

FIG. 5D is a view for explaining the decryption and printing of twice-encrypted print data 583 which was encrypted pursuant to the alternative of FIG. 5B. First, twice-encrypted data 583 is passed to smart-card 56 of the intended recipient via smart-card interface 55, whereupon twice-encrypted data 583 is partially decrypted by using recipient private key 531 which is located in smart-card 56. Smart-card 56 thereupon returns the now partially-decrypted data 582 back to the control of printer 50. Next, partially-decrypted data 582 is passed to smart-chip 57 of printer 50 where partially-encrypted data 582 is completely decrypted using printer private key 521 contained in smart-chip 57 in printer 50. The decrypted, "clear" data 581 is now returned from smart-chip 57 to printer 50 for printing.

Although the encryption/decryption described in FIGS. 5B and 5D provide secure printing to an intended printer for an intended recipient, it can be seen that substantially greater resources may be required by smart-chip 57 and smart-card 56 to process twice-encrypted data in comparison to the resources required to process a twice-encrypted symmetric key as depicted in FIGS. 5A and 5C. Other collateral features depicted in FIG. 5B, such as authentication and integrity verification, may also be incorporated in the decryption process of FIG. 5D.

Figure 6:
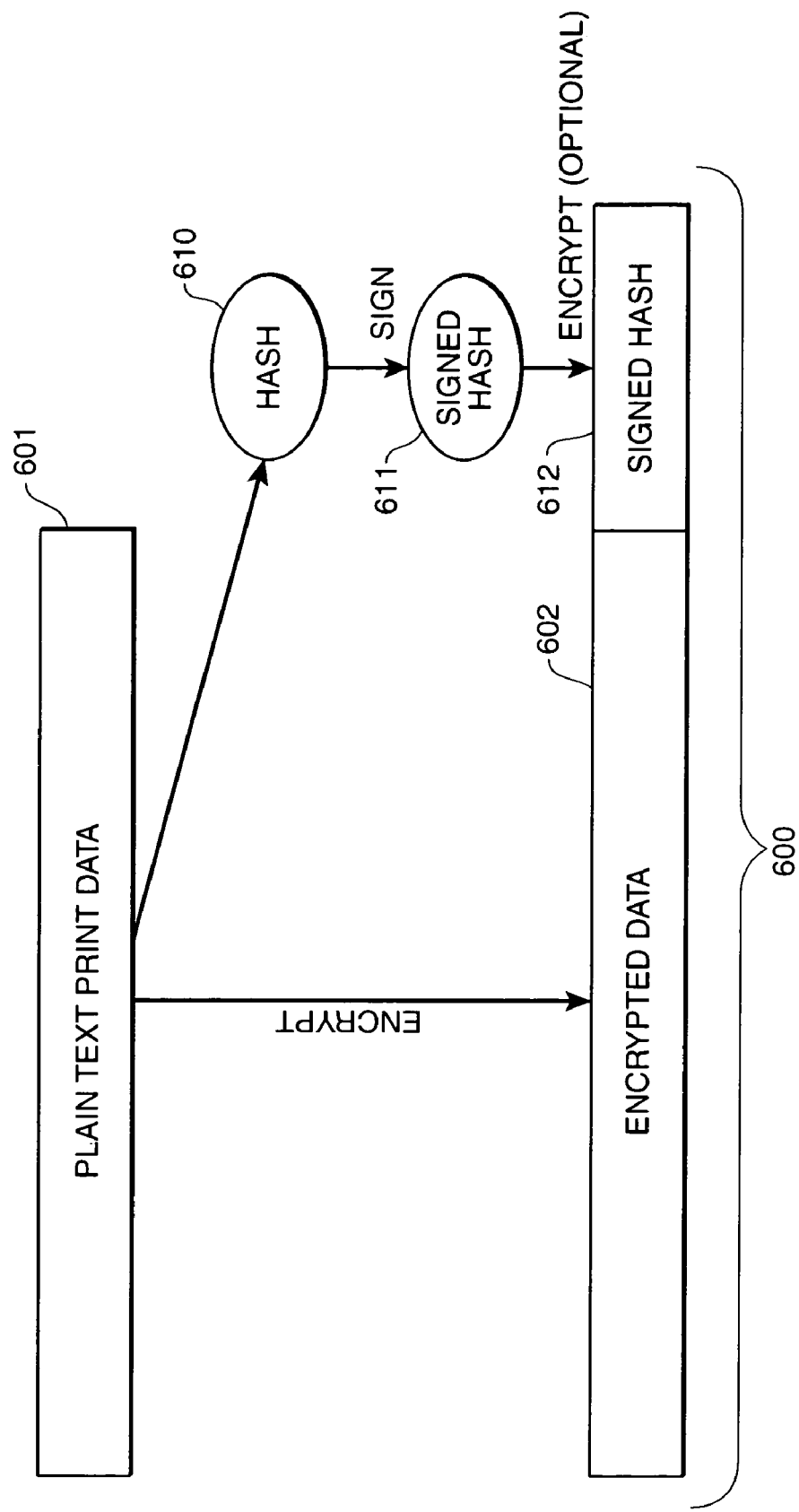
FIG. 6 is a view for providing an explanation of the structure of an encrypted data format according to an embodiment of the present invention.

The hashing process depicted in FIG. 5A provides signed data hash 553 which is a type of checksum that allows the receiving device, such as printer 50, to verify the integrity of the symmetrically encrypted data 502. FIG. 6 shows a view for explaining one method of generating and formatting a signed hash for the data. In FIG. 6, print data 601, which corresponds to the image to be securely printed, is in an unencrypted, "plaintext" format. A hashing algorithm, which is preferably a one-way hash function, is then applied to print data 601 to create data hash 610 which is essentially a message digest. Data hash 610 is then digitally signed using the private key of the sender, such as sender private key 560 of FIG. 5A. Signed hash 611 may then be optionally encrypted. In either case, signed hash 611 is copied to signed hash 612 which is part of data block 600 for transmission to the intended printer where it is used for authentication and integrity verification purposes.

Figure 7A:
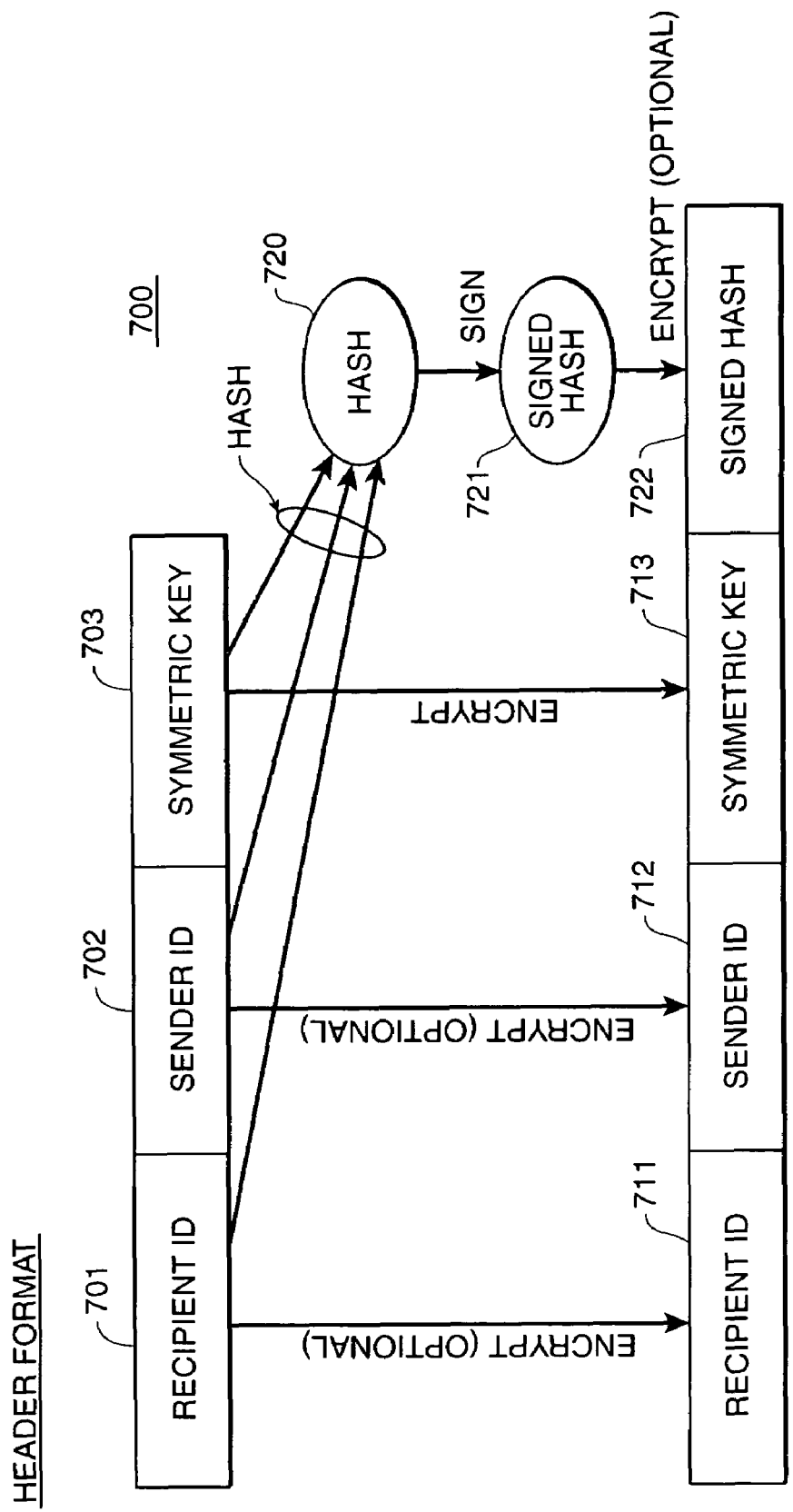
FIG. 7A is a view for providing an explanation of the structure of an encrypted header format according to an embodiment of the present invention.

FIG. 7A is a view for explaining the structure of the header according to a preferred embodiment of the invention. Specifically, recipient ID 701, sender ID 702 and symmetric key 703 are initially provided in a clear, plaintext format for inclusion in header 700 as depicted in FIG. 7A. A hashing algorithm is then collectively performed on recipient ID 701, sender ID 702 and symmetric key 703 to create hash 720. Hash 720 is then signed with the private key of the sender, such as sender private key 560 as depicted in FIG. 5A, to create signed hash 721. Signed hash 721 may then be optionally encrypted. In either case, signed hash 721 is then copied to signed hash 722 for inclusion in header 700.

Recipient ID 701 is left in a clear, plaintext format, copied to recipient ID 711 and included in header 700. In the alternative, recipient ID 701 may be encrypted with the public key of the intended printer for anonymity of the intended recipient's identification, copied to recipient ID 711 and included in header 700. In either case, the intended printer can extract and read recipient ID 711 upon receipt of the header, thereby allowing the intended printer to queue the print job corresponding to the intended recipient. Sender ID 702 may be encrypted with the public key of the intended printer before inclusion in header 700, but such encryption is not necessary. Either way, sender ID 702 is copied to sender ID 712 and included in header 700. Symmetric key 703 is preferably twice-encrypted as shown in FIG. 5A and then provided in twice-encrypted, symmetric key 713 and included in header 700.

Figure 7B:
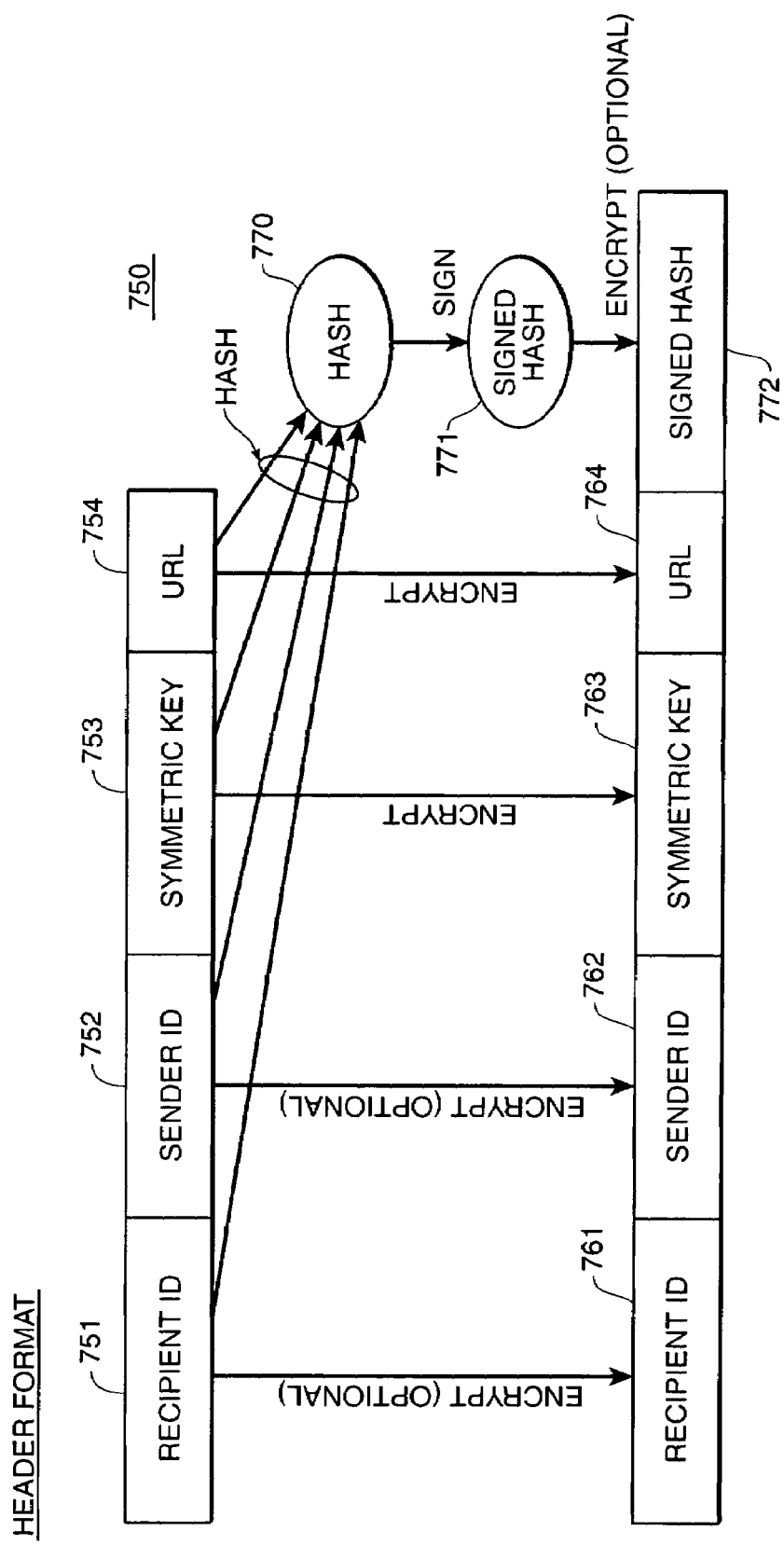
FIG. 7B is a view for providing an explanation of the structure of an encrypted header format according to another embodiment of the present invention.

An alternative structure for the header is shown in FIG. 7B whereby the header is structured so that it can be transmitted to the intended printer separately from the encrypted data. Specifically, recipient ID 751, sender ID 752, symmetric key 753 and a uniform resource locator (URL) 754 are initially provided in a clear, plaintext format for inclusion in header 750 as depicted in FIG. 7A. URL 754 is preferably an address location where the encrypted data is stored for later retrieval and transmission to the intended printer. For instance, twice-encrypted data 512, as depicted in FIG. 5A, would be maintained on fixed disk 280 of desktop computer 10, or on fixed disk 41 of server 40, at a memory location corresponding to URL 754. URL 754 is then included in header 750 which is sent to the intended printer without the encrypted data that corresponds to header 750. Desktop computer 10, or server 40, as the case may be, subsequently sends the corresponding encrypted data to the intended printer upon receipt of a request from the intended printer which contains a reference to URL 754. In this manner, the intended printer does not use memory space for storing the encrypted data until it is needed, upon which the intended printer pulls the encrypted data from its storage location by reference to corresponding URL 754.

A hashing algorithm is collectively performed on recipient ID 751, sender ID 752, symmetric key 753 and URL 754 to create hash 770. Hash 770 is then signed with the private key of the sender, such as sender private key 560 as depicted in FIG. 5A, to create signed hash 771. Signed hash 771 may also be optionally encrypted for further security. In either case, signed hash 771 is copied to signed hash 772 for inclusion in header 750.

Recipient ID 751 is left in a clear, plaintext format, copied to recipient ID 761 and included in header 750. In the alternative, recipient ID 751 may be encrypted with the public key of the intended printer for anonymity of the intended recipient's identification, copied to recipient ID 761 and included in header 750. In either case, the intended printer can extract and read recipient ID 761 upon receipt of the header, thereby allowing the intended printer to queue the print job corresponding to the intended recipient. Sender ID 752 may be encrypted with the public key of the intended printer before inclusion in header 750, but such encryption is not necessary. Either way, sender ID 752 is copied to sender ID 762 and included in header 750. Symmetric key 753 is preferably twice-encrypted pursuant to the method shown in FIG. 5A and is then provided as twice-encrypted, symmetric key 763 and included in header 750. In this alternative header format, URL 754 is also encrypted, either with the public key of the intended printer or with symmetric key 753, and then stored in URL 764 in header 750.

By this arrangement, header 750 can then be transmitted separately to the intended printer prior to the transmission of the encrypted data corresponding to header 750. In this embodiment of the invention, header 750 is preferably transmitted via an E-mail message to the intended printer, such as printer 50, through E-mail program 287 of desktop computer 10 for receipt by E-mail program 359 of printer 50. Other means of sending header 750 over network 100 to printer 50 can also be used, such as through the use of one or more network protocols. When the encrypted data is needed by printer 50, such as when the intended recipient is present at printer 50, printer 50 can decrypt URL 754 and send a data request containing a reference to URL 754. The encrypted data corresponding to URL 754 is then sent to the intended printer for decryption and printing. Symmetric key 763 is then preferably decrypted in the manner described in FIG. 5C, after which the encrypted data is decrypted and printed in the presence of the intended recipient. In this manner, the memory capacity of the intended printer or of a file server utilized by the intended printer is not burdened with large files of encrypted print data until it is necessary to retrieve such print data for decryption and printing.

Figure 8:
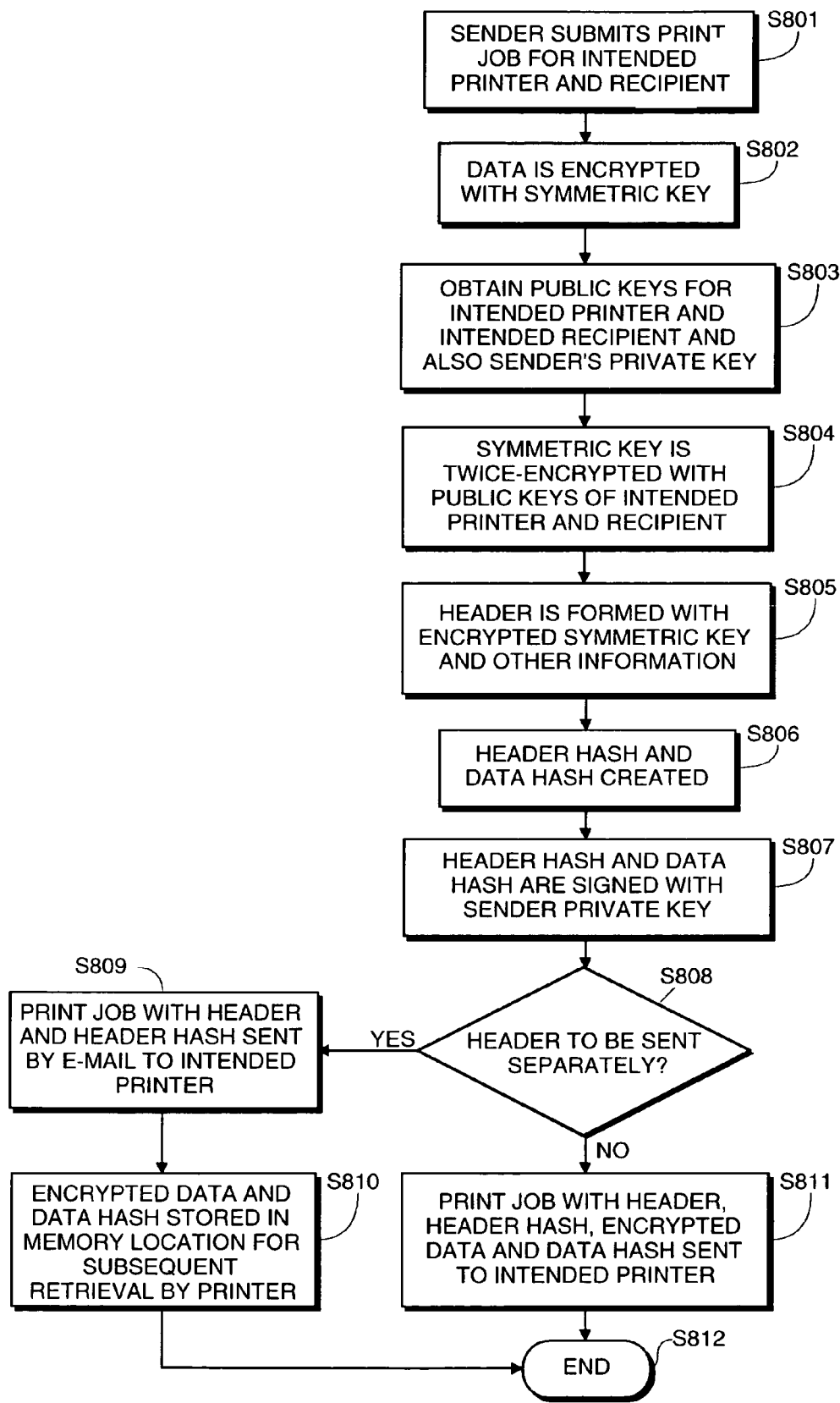
FIG. 8 is a flowchart for providing an explanation of encryption and transmission of a secure print job according to the present invention.
Figure 9:
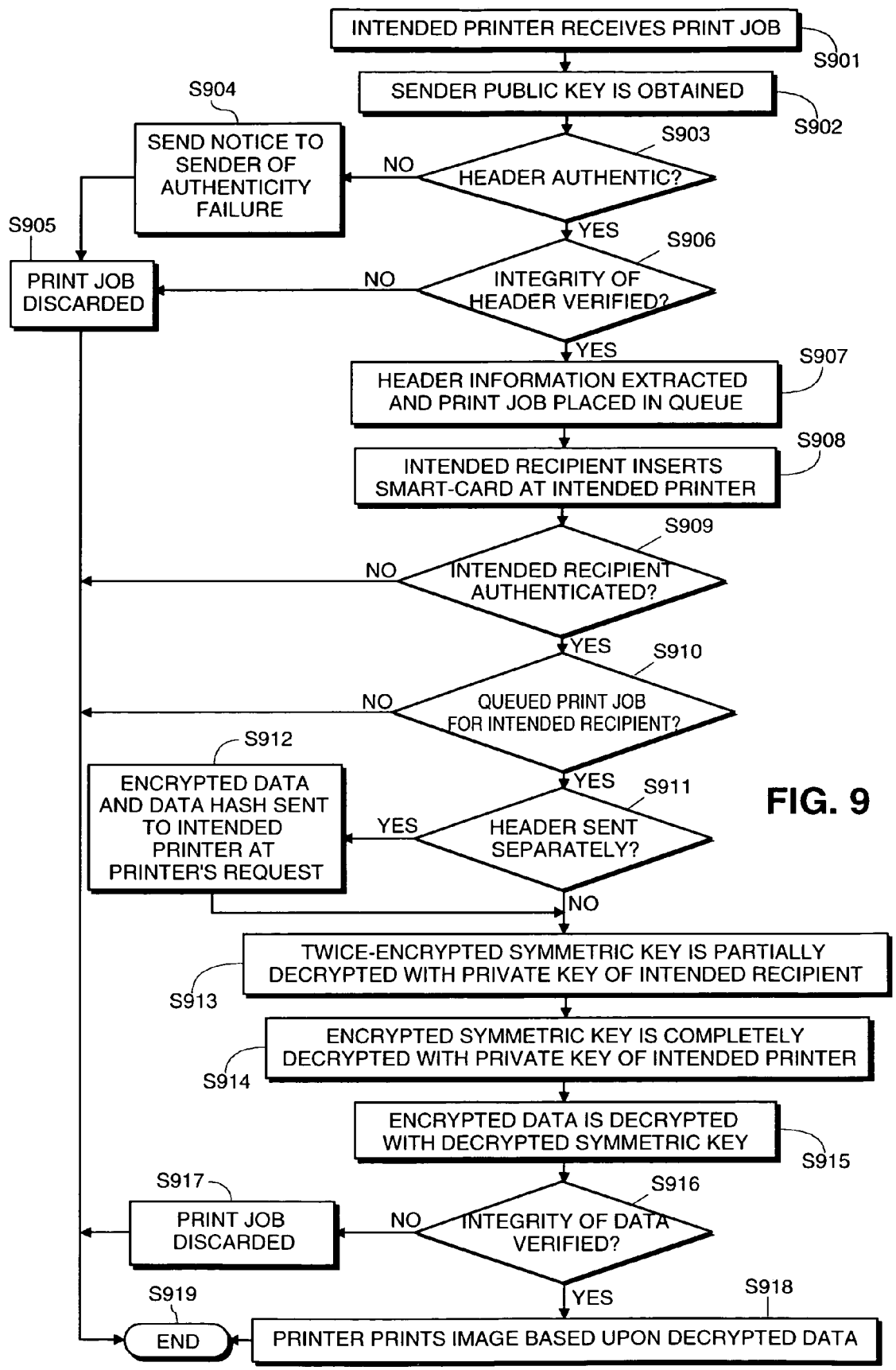
FIG. 9 is a flowchart for providing an explanation of decryption and printing of a secure print job according to the present invention.

FIG. 8 is a flowchart for explaining the overall encryption and transmission of a secure print job according to a preferred embodiment of the present invention. The process steps shown in this figure, as well as those of FIG. 9, are computer-executable process steps stored on a computer-readable memory medium such as disk 280, disk 41, or printer memory 51. First, in step S801, a sender working on a computer in a networked computing environment submits a print job for sending a document or image for secure printing at an intended image output device, such as a printer or facsimile device, in the presence of an intended recipient. Preferably, the print job is submitted by pressing a button in a word processing application, such as Microsoft Word, whereupon a printer driver interface appears for collecting necessary information, such as the intended recipient, and the like. In the alternative, a separate client application may be provided to collect such information. Preferably, the printer driver also performs the remaining steps of FIG. 8 for encryption and transmittal of a secure print job.

Next, the image data associated with the print job is encrypted with a randomly-generated symmetric key in conjunction with a symmetric encryption algorithm as discussed above with regard to FIG. 5A (step S802). In step S803, the public key for the intended recipient and for the intended printer, respectively, are obtained from a public key infrastructure, or other suitable source, and the sender's private key is obtained, preferably from a smart-card 16 belonging to the sender via smart-card interface device 15. In step S804, the symmetric key is twice encrypted, by first encrypting the symmetric key with the public key of the intended printer in conjunction with an asymmetric encryption algorithm, and then encrypting the symmetric key again with the public key of the intended recipient in conjunction with an asymmetric encryption algorithm.

After the symmetric key is twice-encrypted, a header is formed which includes the twice-encrypted symmetric key and which also includes information related to the print job such as the identity of the intended recipient and of the sender in an unencrypted format (step S805). As discussed above, the header may also include a URL which points to the location of the encrypted data which corresponds to the header in the case where the header is to be sent separately from the encrypted data. In step S806, a hashing algorithm is then applied to the header to form a header hash and to the encrypted data to form a data hash. The header hash and data hash are then digitally signed with the private key of the sender in step S807. The header hash and data hash may also be optionally encrypted for additional security. Preferably, the private key of the sender is obtained from a smart-card which is kept in the possession of the sender. In the alternative, a token, flashrom or other means of storage can be used to securely store the private key of the sender.

Next, it is determined in step S808 whether the header is to be sent to the intended printer separate from the corresponding encrypted data. If the header is to be sent separately, control passes to step S809 in which the print job, comprising the header and the header hash, is sent over the network to the intended printer without the corresponding encrypted data. Preferably, the intended printer has an E-mail program and the print job containing the header and header hash is sent to the printer by means of E-mail, although the print job may be separately sent to the intended printer by other means, such as via one or more other network protocols. In the preferred mode, the header contains a URL which corresponds to the location in memory of the encrypted data and data hash. This location can reside on a disk of a computer or server which is accessible by the intended printer via the network. The corresponding encrypted data and data hash are then subsequently sent to the intended printer by the server or computer on which the encrypted data and data hash are stored in step S810, either automatically or at the request of the intended printer by reference to the URL which was provided to the intended printer in the earlier received header. Control then passes to the end (step S812).

If, however, it is determined in step S808 that the header is not to be sent separately from the corresponding encrypted data to the intended printer, control is passed to step S811 in which a print job comprising the header, header hash, encrypted data, and data hash are transmitted over the network to the intended printer. Control then passes to the end in step S812. In this embodiment, the intended printer receives the encrypted data along with the header which contains the twice-encrypted symmetric key for decryption of the encrypted data. In addition, the header hash and data hash are received by the intended printer for verification of the authenticity and integrity of the header and encrypted data.

FIG. 9 is a flowchart for explaining the decryption and printing of a secure print job according to a preferred embodiment of the present invention. First, the intended printer receives a secure print job in step S901. As discussed above with respect to FIG. 8, the print job may only comprise the header and header hash as in the case where the header and header hash are received by the intended printer separately by E-mail. Otherwise, the print job comprises the encrypted data and data hash along with the header and header hash and is received by the intended printer by normal means over the network.

Next, the public key of the sender is obtained from a public key infrastructure, from another suitable source, or from a copy of the sender's digital certificate provided in the header for use in the subsequent authentication and verification of integrity of the secure print job (step S902). In step S903 the sender's public key is used to check the authenticity of the digital signature of the header hash of the secure print job. If the header hash is not authentic, control passes to step S904 in which a notice is preferably sent to the sender to warn the sender that a non-authenticated print job has been detected. Next, in step S905 the print job is discarded. Flow then passes to the end in step S919. If, however, the header hash is determined to be authentic in step S903, flow passes to step S906 in which the integrity of the header is verified against the header hash.

In step S906 a hashing algorithm is used to compare the header to the signed data hash to verify that the header was received intact and was not tampered with, therefore indicating that the header is of reliable integrity. If the integrity of the header is in question, control passes to step S905 in which the print job is discarded. Control then passes to the end in step S919. If, however, the header is of reliable integrity, control passes to step S907 in which header information, such as the identity of the intended recipient, is extracted from the header whereupon the print job is placed in a print queue for subsequent printing. Preferably, the print job is sent from the printer to a local server on the network where it is stored in a print queue according to the identification of the intended recipient until subsequently retrieval by the intended printer. In the alternative, the print queue may be maintained in a large memory device within the intended printer itself.

In step S908, the intended recipient arrives at the location of the intended printer and inserts a smart-card belonging to the intended recipient into a smart-card interface device which is connected to the intended printer. Preferably, the smart-card contains a unique private key and also contains authenticating identification information corresponding to the intended recipient. The printer, via the smart-card interface device, obtains the authenticating identification information of the intended recipient from the smart-card and determined whether the identification of the intended recipient is authentic (step S909). If the identification information is not authentic, control passes to the end in step S919. If the identification information is authentic, the print queue, which is located in either the printer itself or in a local server, is queried, preferably by reference to the identification of the intended recipient, to determine if there are any print jobs corresponding to the intended recipient (step S910). If there are not any print jobs in the print queue corresponding to the intended recipient, control passes to the end in step S919. If, on the other hand, there is a print job in the print queue corresponding to the intended recipient, the next sequential print job in the print queue is obtained and control passes to step S911.

In step S911, the print job is examined to determine if the print job contains only the header and header hash, as in the case where the header and header hash are sent separately by e-mail to the printer without the encrypted data and data hash. If this is the case, the intended printer sends a request to the location where the encrypted data is stored, such as a server or computer on the network, to retrieve the encrypted data whereupon the encrypted data and corresponding data hash are transmitted from the server or computer, as the case may be, to the intended printer (step S912). In the preferred mode, the request by the intended printer to retrieve the encrypted data contains a reference to a URL contained in the header which was received earlier by the intended printer, wherein the URL points to the location of the encrypted data and corresponding data hash. In this manner, the intended printer is not required to store large files of encrypted data until they are needed for printing, at which time the encrypted data is pulled from its location on a server or computer to the intended printer. The retrieval request by the printer and subsequent transmission of the encrypted data and data hash preferably are implemented by normal network communication means, such as TCP/IP protocol and HTTP protocol where the retrieval request contains a reference to a URL, although other protocols such as FTP may also be used. Control then passes to step S913. If it is determined in step S911 that the header was not sent separately to the intended printer, then the print job already comprises the encrypted data along with the header, and therefore control passes directly to step S913.

Next, in step S913, the twice-encrypted symmetrical key is extracted from the header of the print job and is partially decrypted by using the private key of the intended recipient in conjunction with an asymmetric decryption algorithm. In the preferred embodiment, the smart-card of the intended recipient contains the intended recipient's private key and also contains a microprocessor such that the twice-encrypted symmetrical key is passed to the smart-card by the printer through a smart-card interface device. In this manner, the partial decryption actually takes place on the smart-card itself, thereby preventing external access to the private key of the intended recipient which is contained on the smart-card.

The partially decrypted symmetric key is then returned from the smart-card to the printer whereupon the partially decrypted symmetric key is completely decrypted by using the private key of the intended printer in conjunction with an asymmetric decryption algorithm (step S914). Preferably, the private key of the intended printer is contained in a smart-chip which is embedded within the printer. The partially decrypted symmetric key is passed to the smart-chip where it is completely decrypted using the private key contained in the smart-chip, thereby preventing external access to the printer's private key which is contained on the smart-chip. Other means for storing the private key of the intended printer could also be used, such as a token, flashrom, or the like.

The completely decrypted, "clear" symmetric key is then returned from the smart-chip to the intended printer, whereupon the decrypted, "clear" symmetric key is used to decrypt the encrypted data pursuant to a symmetric decryption algorithm (step S915). Next, the integrity of the decrypted data is verified in step S916 by comparing the data with the data hash through the use of a hashing algorithm as discussed above. If the integrity of the decrypted data cannot be verified, then the data may have been intercepted and/or tampered with such that it cannot be relied upon, and therefore control is passed to step S917 in which the entire print job is discarded. Control is then passed to the end in step S919. If, however, the integrity of the decrypted data is verified in step S916, control passes to step S918 in which an image is printed by the intended printer in accordance with the decrypted data (step S912). Control then passes to the end in step S919.

In this manner, secure printing is provided such that an image can be generated only by an intended image output device in the presence of an intended recipient. In particular, the print data is encrypted in such a manner that the data can only be decrypted using a combination of secret keys which are supplied by the intended image output device and by the intended recipient, respectively.

The invention has been described with particular illustrative embodiments. It is to be understood that the invention is not limited to the above-described embodiments and that various changes and modifications may be made by those of ordinary skill in the art without departing from the spirit and scope of the invention.

What is claimed is:

1. A method for secure transmission of data to an intended image output device, wherein the data can be used to generate an image at the intended image output device in the presence of an intended recipient, the method comprising:

an encrypting step of twice encrypting the data using a first key and a second key, the first key being a public key of a first private key/public key pair, a private key of the first private key/public key pair being primarily in the sole possession of the intended image output device, and the second key being a public key of a second private key/public key pair, a private key of the second private key/public key pair being primarily in the sole possession of the intended recipient of the image; and a transmitting step of transmitting the twice-encrypted data to the intended image output device.

2. A method for secure transmission of data to an intended image output device, wherein the data can be used to generate an image at the intended image output device in the presence of an intended recipient, the method comprising:

a first encrypting step of encrypting the data using a first key;

a second encrypting step of twice encrypting the first key using a second key and a third key, the second key being a public key of a first private key/public key pair, a private key of the first private key/public key pair being primarily in the sole possession of the intended image output device, and the third key being a public key of a second private key/public key pair, a private key of the second private key/public key pair being primarily in the sole possession of the intended recipient of the image; and a transmitting step of transmitting the encrypted data and the twice-encrypted first key to the intended image output device.

3. A method according to claim 2, wherein the first key is randomly generated.

4. A method according to claim 2, wherein the first encrypting step utilizes a symmetric encryption algorithm.

5. A method according to claim 2, wherein the second encrypting step utilizes an asymmetric encryption algorithm.

6. A method according to claim 2, wherein the second encrypting step encrypts the first key using the second key before encrypting the first key using the third key.

7. A method according to claim 2, wherein the second encrypting step encrypts the first key using the third key before encrypting the first key using the second key.

8. A method according to claim 2, wherein, in the transmitting step, the twice-encrypted first key is contained in a header which also contains information related to the identity of a device initiating the secure transmission.

9. A method according to claim 2, wherein, in the transmitting step, the twice-encrypted first key is contained in a header which also contains information related to the identity of a person initiating the secure transmission.

10. A method according to claim 9, further comprising:
a hashing step of processing the header and the encrypted data with a hashing algorithm, resulting in a header hash and a data hash; and
a signing step of digitally signing the header hash and the data hash with a private key of a third private key/public key pair, the private key of the third private key/public key pair being primarily maintained in the sole possession of the person initiating the secure transmission,
wherein the transmitting step further transmits the signed header hash and the signed data hash.

11. A method according to claim 2, wherein the intended image output device is a printer.

12. A method according to claim 2, wherein the intended image output device is a facsimile machine.

13. A method for secure transmission of data to an intended image output device, wherein the data can be used to generate an image at the intended image output device in the presence of an intended recipient, the method comprising:
a first encrypting step of encrypting the data using a first key;
a second encrypting step of twice encrypting the first key using a second key and a third key, the second key being a public key of a first private key/public key pair, a private key of the first private key/public key pair being primarily in the sole possession of the intended image output device, and the third key being a public key of a second private key/public key pair, a private key of the second private key/public key pair being primarily in the sole possession of the intended recipient of the image;
a generating step of generating a header containing the twice-encrypted first key;
a first transmitting step of transmitting the header to the intended image output device;
a receiving step of receiving a request from the intended image output device for the encrypted data; and
a second transmitting step of transmitting the encrypted data to the intended image output device.

14. A method according to claim 13, wherein the first transmitting step transmits the header to the intended image output device by e-mail.

15. A method according to claim 13, wherein the header which is generated in the generating step also contains a reference to a location of the encrypted data, and wherein the request for encrypted data contains the reference to the location of the encrypted data.

16. A method for generating an image from twice-encrypted data transmitted to an intended image output device, wherein the twice-encrypted data can be used to generate the image at the intended image output device in the presence of an intended recipient, the method comprising:
a receiving step of receiving twice-encrypted data;
a decrypting step of twice decrypting the twice-encrypted data using a first key and a second key, the first key being a private key of a first private key/public key pair, the private key of the first private key/public key pair being primarily in the sole possession of the intended recipient of the image, and the second key being a private key of a second private key/public key pair, the private key of the second private key/public key pair being primarily in the sole possession of the intended image output device; and
an image generating step of generating an image from the decrypted data.

17. A method for generating an image from data transmitted to an intended image output device, wherein the data can be used to generate the image at the intended image output device in the presence of an intended recipient, the method comprising:
a receiving step of receiving encrypted data and a twice-encrypted first key;
a first decrypting step of twice decrypting the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/public key pair being primarily in the sole possession of the intended image output device;
a second decrypting step of decrypting the encrypted data using the decrypted first key; and
an image generating step of generating an image from the decrypted data.

18. A method according to claim 17, wherein the first decrypting step utilizes an asymmetric decryption algorithm.

19. A method according to claim 17, wherein the second decrypting step utilizes a symmetric decryption algorithm.

20. A method according to claim 17, wherein the first decrypting step decrypts the twice-encrypted first key using the second key before decrypting the twice-encrypted first key using the third key.

21. A method according to claim 17, wherein the first decrypting step decrypts the twice-encrypted first key using the third key before decrypting the twice-encrypted first key using the second key.

22. A method according to claim 17, wherein the third key is contained within the intended image output device, whereby the third key is primarily shielded from access by devices other than the intended image output device.

23. A method according to claim 17, wherein the second key is contained in a smart-card possessed by the intended recipient, whereby the second key is hidden from recipients other than the intended recipient.

24. A method according to claim 17, wherein the receiving step further receives a signed header hash and a signed data hash, the method further comprising a verifying step of verifying the authenticity and the integrity of the signed header hash and of the signed data hash.

25. A method according to claim 24, further comprising the step of discarding the encrypted data rather than outputting an image based upon the encrypted data, if the signed header hash or the signed data hash fail the verification of authenticity and integrity.

26. A method according to claim 25, further comprising the step of sending a notice to a sender of the signed header, if the signed header hash or the signed data hash fail the verification of authenticity and integrity.

27. A method according to claim 17, wherein the intended image output device is a printer.

28. A method according to claim 17, wherein the intended image output device is a facsimile machine.

29. A method for generating an image from data transmitted to an intended image output device, wherein the data can be used to generate the image at the intended image output device in the presence of an intended recipient, the method comprising:
 a receiving step of receiving a header containing a twice-encrypted first key;
 a sending step of sending a request for encrypted data corresponding to the header;
 a receiving step of receiving encrypted data corresponding to the header;
 a first decrypting step of twice decrypting the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/public key pair being primarily in the sole possession of the intended image output device;
 a second decrypting step of decrypting the encrypted data using the decrypted first key; and
 an image generating step of generating an image from the decrypted data.

30. A method according to claim 29, wherein the header is received in the receiving step by e-mail.

31. A method according to claim 29, wherein the header also contains a reference to a location of the encrypted data, and wherein the request for encrypted data contains the reference to the location of the encrypted data.

32. An apparatus for secure transmission of data to an intended image output device, wherein the data can be used to generate an image at the intended image output device for receipt by an intended recipient, the apparatus comprising:
 a memory including a region for storing executable process steps and data for the image; and
 a processor for executing the executable process steps;
 wherein the executable process steps include (a) an encrypting step of twice encrypting the data using a first key and a second key, the first key being a public key of a first private key/public key pair, a private key of the first private key/public key pair being primarily in the sole possession of the intended image output device, and the second key being a public key of a second private key/public key pair, a private key of the second private key/public key pair being primarily in the sole possession of the intended recipient of the image; and (b) a transmitting step of transmitting the twice-encrypted data to the intended image output device.

33. An apparatus for secure transmission of data to an intended image output device, wherein the data can be used to generate an image at the intended image output device in the presence of an intended recipient, the apparatus comprising:
 a memory including a region for storing executable process steps and data for the image; and
 a processor for executing the executable process steps;
 wherein the executable process steps include (a) a first encrypting step of encrypting the data using a first key; (b) a second encrypting step of twice encrypting the first key using a second key and a third key, the second key being a public key of a first private key/public key pair, a private key of the first private key/public key pair being primarily in the sole possession of the intended image output device, and the third key being a public key of a second private key/public key pair, a private key of the second private key/public key pair being primarily in the sole possession of the intended recipient of the image; and (c) a transmitting step of transmitting the encrypted data and the twice-encrypted first key to the intended image output device.

34. An apparatus according to claim 33, wherein the first key is randomly generated.

35. An apparatus according to claim 33, wherein the first encrypting step utilizes a symmetric encryption algorithm.

36. An apparatus according to claim 33, wherein the second encrypting step utilizes an asymmetric encryption algorithm.

37. An apparatus according to claim 33, wherein the second encrypting step encrypts the first key using the second key before encrypting the first key using the third key.

38. An apparatus according to claim 33, wherein the second encrypting step encrypts the first key using the third key before encrypting the first key using the second key.

39. An apparatus according to claim 33, wherein, in the transmitting step, the twice-encrypted first key is contained in a header which also contains information related to the identity of a device initiating the secure transmission.

40. An apparatus according to claim 33, wherein, in the transmitting step, the twice-encrypted first key is contained in a header which also contains information related to the identity of a person initiating the secure transmission.

41. An apparatus according to claim 40, wherein the executable process steps further comprise: (d) a hashing step of processing the header and the encrypted data with a hashing algorithm, resulting in a header hash and a data hash; and (e) a signing step of digitally signing the header hash and the data hash with a private key of a third private key/public key pair, the private key of the third private key/public key pair being primarily maintained in the sole possession of the person initiating the secure transmission, wherein the transmitting step further transmits the signed header hash and the signed data hash.

42. An apparatus according to claim 33, wherein the apparatus is a computer and the intended image output device is a printer.

43. An apparatus according to claim 33, wherein the apparatus is a computer and the intended image output device is a facsimile machine.

44. An apparatus according to claim 33, wherein the apparatus is a first facsimile machine and the intended image output device is a second facsimile machine.

45. An apparatus for secure transmission of data to an intended image output device, wherein the data can be used to generate an image at the intended image output device in the presence of an intended recipient, the apparatus comprising:

a memory including a region for storing executable process steps and data for the image; and a processor for executing the executable process steps;

wherein the executable process steps include (a) a first encrypting step of encrypting the data using a first key; (b) a second encrypting step of twice encrypting the first key using a second key and a third key, the second key being a public key of a first private key/public key pair, a private key of the first private key/public key pair being primarily in the sole possession of the intended image output device, and the third key being a public key of a second private key/public key pair, a private key of the second private key/public key pair being primarily in the sole possession of the intended recipient of the image; (c) a generating step of generating a header containing the twice-encrypted first key; (d) a first transmitting step of transmitting the header to the intended image output device; (e) a receiving step of receiving a request from the intended image output device for the encrypted data; and (f) a second transmitting step of transmitting the encrypted data to the intended image output device.

46. A method according to claim 45, wherein the first transmitting step transmits the header to the intended image output device by e-mail.

47. A method according to claim 45, wherein the header which is generated in the generating step also contains a reference to a location of the encrypted data, and wherein the request for encrypted data contains the reference to the location of the encrypted data.

48. An image output device for generating an image from data transmitted to the image output device, wherein the data can be used to generate the image at the image output device in the presence of an intended recipient, the image output device comprising:

a receiver for receiving twice-encrypted data;

an image generator for generating an image from image data;

a memory including a region for storing executable process steps and data; and a processor for executing the executable process steps, wherein the executable process steps include: (a) a decrypting step of twice decrypting the twice-encrypted data using a first key and a second key, the first key being a private key of a first private key/public key pair, the private key of the first private key/public key pair being primarily in the sole possession of the intended recipient of the image, and the second key being a private key of a second private key/public key pair, the private key of the second private key/public key pair being primarily in the sole possession of the intended image output device; and (b) an image generating step of generating an image from the decrypted data.

49. An image output device for generating an image from data transmitted to the image output device, wherein the data can be used to generate the image at the image output device in the presence of an intended recipient, the image output device comprising:

a receiver for receiving encrypted data and an twice-encrypted first key;

an image generator for generating an image from image data;

a memory including a region for storing executable process steps and data; and a processor for executing the executable process steps, wherein the executable process steps include: (a) a first decrypting step of decrypting the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/public key pair being primarily in the sole possession of the intended image output device; (b) a second decrypting step of decrypting the encrypted data using the decrypted first key; and (c) an image generating step of generating an image from the decrypted data using the image generator.

50. An image output device according to claim 49, wherein the first decrypting step utilizes an asymmetric decryption algorithm.

51. An image output device according to claim 49, wherein the second decrypting step utilizes a symmetric decryption algorithm.

52. An image output device according to claim 49, wherein the first decrypting step decrypts the first key using the second key before decrypting the first key using the third key.

53. An image output device according to claim 49, wherein the first decrypting step decrypts the first key using the third key before decrypting the first key using the second key.

54. An image output device according to claim 49, wherein the third key is contained within the image output device, whereby the third key is primarily shielded from access by devices other than the image output device.

55. An image output device according to claim 49, wherein the second key is contained in a smart-card possessed by the intended recipient, whereby the second key is hidden from recipients other than the intended recipient.

56. An image output device according to claim 49, wherein the receiving step further receives a signed header hash and a signed data hash, the executable process steps further comprising a verifying step of verifying the authenticity and integrity of the signed header hash and of the signed data hash.

57. An image output device according to claim 56, wherein the executable process steps further comprise the step of discarding the encrypted data rather than outputting an image, if the signed header hash or the signed data hash fail the verification of authenticity and integrity.

58. An image output device to claim 57, wherein the executable process steps further comprise the step of sending a notice to a sender of the signed header, if the signed header hash or the signed data hash fail the verification of authenticity and integrity.

59. An image output device according to claim 49, wherein the image output device is a printer.

60. An image output device according to claim 49, wherein the image output device is a facsimile machine.

61. An image output device for generating an image from data transmitted to the image output device, wherein the data can be used to generate the image at the image output device in the presence of an intended recipient, the image output device comprising:

a receiver for receiving a header containing a twice-encrypted first key;

an image generator for generating an image from image data;
a memory including a region for storing executable process steps and data; and
a processor for executing the executable process steps, wherein the executable process steps include: (a) a sending step of sending a request for encrypted data corresponding to the header; (b) a receiving step of receiving encrypted data corresponding to the header; (c) a first decrypting step of twice decrypting the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/public key pair being primarily in the sole possession of the intended image output device; (d) a second decrypting step of decrypting the encrypted data using the decrypted first key; and (e) an image generating step of generating an image from the decrypted data.

62. A method according to claim 61, wherein the header is received by e-mail.

63. A method according to claim 61, wherein the header also contains a reference to a location of the encrypted data, and wherein the request for encrypted data contains the reference to the location of the encrypted data.

64. A computer-readable medium which stores computer-executable process steps which securely transmit data to an intended image output device, wherein the data can be used to generate an image at the intended image output device in the presence of an intended recipient, the computer-executable process steps comprising:
a data generating step to generate data for an image;
an encrypting step to twice encrypt the data using a first key and a second key, the first key being a public key of a first private key/public key pair, a private key of the first private key/public key pair being primarily in the sole possession of the intended image output device, and the second key being a public key of a second private key/public key pair, a private key of the second private key/public key pair being primarily in the sole possession of the intended recipient of the image; and
a transmitting step to transmit the twice-encrypted data to the intended image output device.

65. A computer-readable medium which stores computer-executable process steps which securely transmit data to an intended image output device, wherein the data can be used to generate an image at the intended image output device in the presence of an intended recipient, the computer-executable process steps comprising:
a data generating step to generate data for an image;
a first encrypting step to encrypt the data using a first key;
a second encrypting step to encrypt the first key twice using a second key and a third key, the second key being a public key of a first private key/public key pair, a private key of the first private key/public key pair being primarily in the sole possession of the intended image output device, and the third key being a public key of a second private key/public key pair, a private key of the second private key/public key pair being primarily in the sole possession of the intended recipient of the image; and
a transmitting step to transmit the encrypted data and the twice-encrypted first key to the intended image output device.

66. A computer-readable medium according to claim 65, wherein the first key is randomly generated.

67. A computer-readable medium according to claim 65, wherein the first encrypting step utilizes a symmetric encryption algorithm.

68. A computer-readable medium according to claim 65, wherein the second encrypting step utilizes an asymmetric encryption algorithm.

69. A computer-readable medium according to claim 65, wherein the second encrypting step encrypts the first key using the second key before encrypting the first key using the third key.

70. A computer-readable medium according to claim 65, wherein the second encrypting step encrypts the first key using the third key before encrypting the first key using the second key.

71. A computer-readable medium according to claim 65, wherein, in the transmitting step, the twice-encrypted first key is contained in a header which also contains information related to the identity of a device initiating the secure transmission.

72. A computer-readable medium according to claim 65, wherein, in the transmitting step, the twice-encrypted first key is contained in a header which also contains information related to the identity of a person initiating the secure transmission.

73. A computer-readable medium according to claim 72, wherein the computer-executable process steps further comprise:
a hashing step to process the header and the encrypted data with a hashing algorithm, resulting in a header hash and a data hash; and
a signing step to digitally sign the header hash and the data hash with a private key of a third private key/public key pair, the private key of the third private key/public key pair being primarily maintained in the sole possession of the person initiating the secure transmission,
wherein the transmitting step further transmits the signed header hash and the signed data hash.

74. A computer-readable medium according to claim 65, wherein the intended image output device is a printer.

75. A computer-readable medium according to claim 65, wherein the intended image output device is a facsimile machine.

76. A computer-readable medium which stores computer-executable process steps which securely transmit data to an intended image output device, wherein the data can be used to generate an image at the intended image output device in the presence of an intended recipient, the computer-executable process steps comprising:
a data generating step to generate data for an image;
a first encrypting step to encrypt the data using a first key;
a second encrypting step to twice encrypt the first key using a second key and a third key, the second key being a public key of a first private key/public key pair, a private key of the first private key/public key pair being primarily in the sole possession of the intended image output device, and the third key being a public key of a second private key/public key pair, a private key of the second private key/public key pair being primarily in the sole possession of the intended recipient of the image;
a generating step to generate a header containing the twice-encrypted first key;
a first transmitting step to transmit the header to the intended image output device;

a receiving step to receive a request from the intended image output device for the encrypted data; and a second transmitting step to transmit the encrypted data to the intended image output device.

77. A computer-readable medium according to claim 76, wherein the first transmitting step transmits the header to the intended image output device by e-mail.

78. A computer-readable medium according to claim 76, wherein the header which is generated in the generating step also contains a reference to a location of the encrypted data, and wherein the request for encrypted data contains the reference to the location of the encrypted data.

79. A computer-readable medium which stores computer-executable process steps for generating an image from twice-encrypted data transmitted to an intended image output device, wherein the twice-encrypted data can be used to generate the image at the intended image output device in the presence of an intended recipient, the computer-executable process steps comprising:

a receiving step to receive twice-encrypted data;

a decrypting step to twice decrypt the twice-encrypted data using a first key and a second key, the first key being a private key of a first private key/public key pair, the private key of the first private key/public key pair being primarily in the sole possession of the intended recipient of the image, and the second key being a private key of a second private key/public key pair, the private key of the second private key/public key pair being primarily in the sole possession of the intended image output device; and an image generating step to generate an image from the decrypted data.

80. A computer-readable medium which stores computer-executable process steps for generating an image from data transmitted to an intended image output device, wherein the data can be used to generate the image at the intended image output device in the presence of an intended recipient, the computer-executable process steps comprising:

a receiving step to receive encrypted data and a twice-encrypted first key;

a first decrypting step to twice decrypt the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/ public key pair being primarily in the sole possession of the intended image output device;

a second decrypting step to decrypt the encrypted data using the decrypted first key; and an image generating step to generate an image from the decrypted data.

81. A computer-readable medium according to claim 80, wherein the first decrypting step utilizes an asymmetric decryption algorithm.

82. A computer-readable medium according to claim 80, wherein the second decrypting step utilizes a symmetric decryption algorithm.

83. A computer-readable medium according to claim 80, wherein the first decrypting step decrypts the twice-encrypted first key using the second key before decrypting the twice-encrypted first key using the third key.

84. A computer-readable medium according to claim 80, wherein the first decrypting step decrypts the twice-encrypted first key using the third key before decrypting the twice-encrypted first key using the second key.

85. A computer-readable medium according to claim 80, wherein the third key is contained within the intended image output device, whereby the third key is primarily shielded from access by devices other than the intended image output device.

86. A computer-readable medium according to claim 80, wherein the second key is contained in a smart-card possessed by the intended recipient, whereby the second key is hidden from recipients, other than the intended recipient.

87. A computer-readable medium according to claim 80, wherein the receiving step further receives a signed header hash and a signed data hash, the method further comprising a verifying step of verifying the authenticity and the integrity of the signed header hash and of the signed data hash.

88. A computer-readable medium according to claim 87, further comprising the step of discarding the encrypted data rather than outputting an image based upon the encrypted data, if the signed header hash or the signed data hash fail the verification of authenticity and integrity.

89. A computer-readable medium according to claim 88, further comprising the step of sending a notice to a sender of the signed header, if the signed header hash or the signed data hash fail the verification of authenticity and integrity.

90. A computer-readable medium according to claim 80, wherein the intended image output device is a printer.

91. A computer-readable medium according to claim 80, wherein the intended image output device is a facsimile machine.

92. A computer-readable medium which stores computer-executable process steps for generating an image from data transmitted to an intended image output device, wherein the data can be used to generate the image at the intended image output device in the presence of an intended recipient, the computer-executable process steps comprising:

a receiving step to receive a header containing a twice-encrypted first key;

a sending step to send a request for encrypted data corresponding to the header;

a receiving step to receive encrypted data corresponding to the header;

a first decrypting step to twice decrypt the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/ public key pair being primarily in the sole possession of the intended image output device;

a second decrypting step to decrypt the encrypted data using the decrypted first key; and an image generating step to generate an image from the decrypted data.

93. A computer-readable medium according to claim 92, wherein the header is received in the receiving step by e-mail.

94. A method according to claim 92, wherein the header also contains a reference to a location of the encrypted data, and wherein the request for encrypted data contains the reference to the location of the encrypted data.

95. A printer driver which securely transmits data to an intended printer, wherein the data can be used to generate an image at the intended printer in the presence of an intended recipient, the printer driver comprising:

data generating code for generating data for an image;
encrypting code for twice encrypting the data using a first key and a second key, the first key being a public key of a first private key/public key pair, a private key of the first private key/public key pair being primarily in the sole possession of the intended image output device, and the second key being a public key of a second private key/public key pair, a private key of the second private key/public key pair being primarily in the sole possession of the intended recipient of the image; and
transmitting code for transmitting the twice-encrypted data to the intended image output device.

96. A printer driver which securely transmits data to an intended printer, wherein the data can be used to generate an image at the intended printer in the presence of an intended recipient, the printer driver comprising:
data generating code for generating data for an image;
first encrypting code for encrypting the data using a first key;
second encrypting code for twice encrypting the first key using a second key and a third key, the second key being a public key of a first private key/public key pair, a private key of the first private key/public key pair being primarily in the sole possession of the intended image output device, and the third key being a public key of a second private key/public key pair, a private key of the second private key/public key pair being primarily in the sole possession of the intended recipient of the image; and
transmitting code for transmitting the encrypted data and the twice-encrypted first key to the intended printer.

97. A printer driver according to claim 96, wherein the first key is randomly generated.

98. A printer driver according to claim 96, wherein the first encrypting code utilizes a symmetric encryption algorithm.

99. A printer driver according to claim 96, wherein the second encrypting code utilizes an asymmetric encryption algorithm.

100. A printer driver according to claim 96, wherein the second encrypting code encrypts the first key using the second key before encrypting the first key using the third key.

101. A printer driver according to claim 96, wherein the second encrypting code encrypts the first key using the third key before encrypting the first key using the second key.

102. A printer driver according to claim 96, wherein the twice-encrypted first key is contained in a header which also contains information related to the identity of a person initiating the secure transmission.

103. A printer driver according to claim 102, wherein the header also contains a signed header hash and a signed data hash, and further comprising verification code for verification of the authenticity and integrity of the signed header hash and of the signed data hash.

104. A printer driver according to claim 103, further comprising sending code for sending a notice to a sender of the header, if one of the signed header hash and signed data hash fails the verification of authenticity and integrity.

105. A printer driver which securely transmits data to an intended printer, wherein the data can be used to generate an image at the intended printer in the presence of an intended recipient, the printer driver comprising:
data generating code for generating data for an image;
first encrypting code for encrypting the data using a first key;
second encrypting code for twice encrypting the first key using a second key and a third key, the second key being a public key of a first private key/public key pair, a private key of the first private key/public key pair being primarily in the sole possession of the intended image output device, and the third key being a public key of a second private key/public key pair, a private key of the second private key/public key pair being primarily in the sole possession of the intended recipient of the image;
generating code for generating a header containing the twice-encrypted first key;
first transmitting code for transmitting the header to the intended image output device;
receiving code for receiving a request from the intended image output device for the encrypted data; and
second transmitting code for transmitting the encrypted data to the intended image output device.

106. A printer driver according to claim 105, wherein the first transmitting code transmits the header to the intended image output device by e-mail.

107. A printer driver according to claim 105, wherein the header which is generated in the generating code also contains a reference to a location of the encrypted data, and wherein the request for encrypted data contains the reference to the location of the encrypted data.

108. Computer-executable process steps stored on a computer-readable medium, the computer-executable process steps for generating an image from twice-encrypted data transmitted to an intended image output device, wherein the twice-encrypted data can be used to generate the image at the intended image output device in the presence of an intended recipient, said computer-executable process steps comprising:
receiving code to receive twice-encrypted data;
decrypting code to twice decrypt the twice-encrypted data using a first key and a second key, the first key being a private key of a first private key/public key pair, the private key of the first private key/public key pair being primarily in the sole possession of the intended recipient of the image, and the second key being a private key of a second private key/public key pair, the private key of the second private key/public key pair being primarily in the sole possession of the intended image output device; and
an image generating code to generate an image from the decrypted data.

109. Computer-executable process steps stored on a computer-readable medium, the computer-executable process steps for generating an image from twice-encrypted data transmitted to an intended image output device, wherein the twice-encrypted data can be used to generate the image at the intended image output device in the presence of an intended recipient, said computer-executable process steps comprising:
receiving code to receive encrypted data and a twice-encrypted first key;
first decrypting code to twice decrypt the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/public key pair being primarily in the sole possession of the intended image output device;

second decrypting code to decrypt the encrypted data using the decrypted first key; and image generating code to generate an image from the decrypted data.

110. Computer-executable process steps according to claim 109, wherein the first decrypting code utilizes an asymmetric decryption algorithm.

111. Computer-executable process steps according to claim 109, wherein the second decrypting code utilizes a symmetric decryption algorithm.

112. Computer-executable process steps according to claim 109, wherein the first decrypting code decrypts the twice-encrypted first key using the second key before decrypting the twice-encrypted first key using the third key.

113. Computer-executable process steps according to claim 109, wherein the first decrypting code decrypts the twice-encrypted first key using the third key before decrypting the twice-encrypted first key using the second key.

114. Computer-executable process steps according to claim 109, wherein the third key is contained within the intended image output device, whereby the third key is primarily shielded from access by devices other than the intended image output device.

115. Computer-executable process steps according to claim 109, wherein the second key is contained in a smartcard possessed by the intended recipient, whereby the second key is hidden from recipients other than the intended recipient.

116. Computer-executable process steps according to claim 109, wherein the receiving code further receives a signed header hash and a signed data hash, the method further comprising verifying code to verify the authenticity and the integrity of the signed header hash and of the signed data hash.

117. Computer-executable process steps according to claim 116, further comprising code to discard the encrypted data rather than outputting an image based upon the encrypted data, if the signed header hash or the signed data hash fail the verification of authenticity and integrity.

118. Computer-executable process steps according to claim 117, further comprising code to send a notice to a sender of the signed header, if the signed header hash or the signed data hash fail the verification of authenticity and integrity.

119. Computer-executable process steps according to claim 109, wherein the intended image output device is a printer.

120. Computer-executable process steps according to claim 109, wherein the intended image output device is a facsimile machine.

121. Computer-executable process steps stored on a computer-readable medium, the computer-executable process steps for generating an image from data transmitted to an intended image output device, wherein the data can be used to generate the image at the intended image output device in the presence of an intended recipient, the computer-executable process steps comprising:

receiving code to receive a header containing a twice-encrypted first key;

sending code to send a request for encrypted data corresponding to the header;

receiving code to receive encrypted data corresponding to the header;

first decrypting code to twice decrypt the twice-encrypted first key using a second key and a third key, the second key being a private key of a first private key/public key pair, the private key of the first private key/public key pair being primarily in the sole possession of the intended recipient of the image, and the third key being a private key of a second private key/public key pair, the private key of the second private key/public key pair being primarily in the sole possession of the intended image output device;

second decrypting code to decrypt the encrypted data using the decrypted first key; and image generating code to generate an image from the decrypted data.

122. Computer-executable process steps according to claim 121, wherein the header is received by e-mail.

123. Computer-executable process steps according to claim 121, wherein the header also contains a reference to a location of the encrypted data, and wherein the request for encrypted data contains the reference to the location of the encrypted data.

* * * * *

UNITED STATES PATENT AND TRADEMARK OFFICE
CERTIFICATE OF CORRECTION

PATENT NO. : 7,003,667 B1
APPLICATION NO. : 09/411070
DATED : February 21, 2006
INVENTOR(S) : Royce E. Slick et al.

It is certified that error appears in the above-identified patent and that said Letters Patent is hereby corrected as shown below:

Column 23
    Line 26, "A method" should read --An apparatus--; and
    Line 29, "A method" should read --An apparatus--.

Column 24
    Line 51, "to" should read --according to--.

Column 25
    Line 23, "A method" should read --An image output device--; and
    Line 25, "A method" should read --An image output device--.

Column 28
    Line 60, "A method" should read --A computer-readable medium--.

Signed and Sealed this

Twenty-second Day of August, 2006

JON W. DUDAS
*Director of the United States Patent and Trademark Office*